(12) United States Patent
Huang et al.

(10) Patent No.: US 10,653,124 B2
(45) Date of Patent: May 19, 2020

(54) REEL COMPONENT AND METHOD OF MANUFACTURING SAME

(71) Applicants: Ben Huang, Huntington Beach, CA (US); WINN INCORPORATED, Huntington Beach, CA (US)

(72) Inventors: Ben Huang, Huntington Beach, CA (US); Elmer S. Alfafara, Dana Point, CA (US)

(*) Notice: Subject to any disclaimer, the term of this patent is extended or adjusted under 35 U.S.C. 154(b) by 278 days.

(21) Appl. No.: 15/796,603

(22) Filed: Oct. 27, 2017

(65) Prior Publication Data
US 2018/0317470 A1 Nov. 8, 2018

Related U.S. Application Data

(63) Continuation-in-part of application No. 29/602,815, filed on May 3, 2017, now Pat. No. Des. 844,744, and a continuation-in-part of application No. 29/604,651, filed on May 18, 2017, now Pat. No. Des. 847,298.

(51) Int. Cl.
*A01K 89/01* (2006.01)
*A01K 89/00* (2006.01)

(52) U.S. Cl.
CPC .................... *A01K 89/006* (2013.01)

(58) Field of Classification Search
CPC .................................................. A01K 89/006
See application file for complete search history.

(56) References Cited

U.S. PATENT DOCUMENTS

| | | | |
|---|---|---|---|
| 402,594 | A | 5/1889 | Hook |
| 450,906 | A | 4/1891 | Huang et al. |
| 571,025 | A | 11/1896 | Spamer |
| 834,711 | A | 10/1906 | Clarke et al. |
| 979,266 | A | 12/1910 | Dean |
| 1,008,604 | A | 11/1911 | Lake |
| 1,017,565 | A | 2/1912 | Lard |
| 1,139,843 | A | 5/1915 | Brown |
| 1,345,505 | A | 7/1920 | Persons |

(Continued)

FOREIGN PATENT DOCUMENTS

| | | |
|---|---|---|
| CN | 2090283 | 12/1991 |
| CN | 2109404 | 7/1992 |

(Continued)

OTHER PUBLICATIONS

Photo of the inner surface of a dark grey felt layer with polyurethane layered on an outer surface thereof taken Jan. 15, 2013.

(Continued)

*Primary Examiner* — Emmanuel M Marcelo
(74) *Attorney, Agent, or Firm* — Knobbe, Martens, Olson & Bear, LLP

(57) ABSTRACT

Reel components, such as reel knobs, and methods of assembling the reel components are disclosed herein. The reel knob can include a base and a gripping member. The base can include a recessed area. The gripping member can comprise a resilient material. The gripping member can be sized and shaped to correspond to the recessed area. The gripping member can be adhered to the recessed area. The base can be pressed down onto the gripping member to join the base to the gripping member.

19 Claims, 22 Drawing Sheets

(56) References Cited

U.S. PATENT DOCUMENTS

| | | | |
|---|---|---|---|
| 1,435,088 A | 11/1922 | Smith | |
| 1,480,056 A | 1/1924 | Flint | |
| 1,522,635 A | 1/1924 | Kraeuter | |
| 1,528,190 A | 3/1925 | Howe | |
| 1,617,972 A | 2/1927 | Wallace | |
| 1,701,856 A | 2/1929 | Kraeuter | |
| 1,890,037 A | 12/1932 | Johnson | |
| 1,943,399 A | 1/1934 | Smith | |
| 2,000,295 A | 5/1935 | Oldham | |
| 2,010,627 A | 8/1935 | Dileo | |
| 2,086,062 A | 7/1937 | Bray | |
| 2,103,889 A | 12/1937 | Brisick | |
| 2,115,119 A | 4/1938 | Park | |
| 2,149,911 A | 3/1939 | East | |
| 2,206,056 A | 7/1940 | Sheesley | |
| 2,221,421 A | 11/1940 | Curry | |
| 2,225,839 A | 12/1940 | Moore | |
| 2,449,575 A | 9/1948 | Wilhelm | |
| 2,523,637 A | 9/1950 | Stanfield et al. | |
| 2,592,878 A | 4/1952 | Esposito | |
| 2,671,660 A | 3/1954 | Goodwin | |
| 2,690,338 A | 9/1954 | Brocke | |
| 2,772,090 A | 11/1956 | Brandon | |
| 2,826,852 A | 3/1958 | Wardrip | |
| 2,830,399 A | 4/1958 | Davis | |
| 2,934,285 A | 4/1960 | Niehaus | |
| 2,984,486 A | 5/1961 | Jones | |
| 3,028,283 A | 4/1962 | Lundgren et al. | |
| 3,059,816 A | 10/1962 | Goldstein | |
| 3,071,023 A * | 1/1963 | Herr | G05G 1/085 74/545 |
| 3,073,055 A | 1/1963 | Edwards et al. | |
| 3,087,729 A | 4/1963 | Sullivan | |
| 3,095,198 A | 6/1963 | Gasche | |
| 3,140,873 A | 7/1964 | Goodwin | |
| 3,150,460 A | 9/1964 | Dees | |
| 3,157,723 A | 11/1964 | Hochberg | |
| 3,252,706 A | 5/1966 | Rosasco, Sr. | |
| 3,266,966 A | 8/1966 | Patchell | |
| 3,295,244 A | 1/1967 | Kuntze | |
| 3,311,375 A | 3/1967 | Onions | |
| 3,366,384 A | 1/1968 | Lamkin et al. | |
| 3,368,811 A | 2/1968 | Finney | |
| 3,503,784 A | 3/1970 | Okayama et al. | |
| 3,606,325 A | 9/1971 | Lamkin et al. | |
| 3,697,315 A | 10/1972 | Mine | |
| 3,698,118 A | 10/1972 | Schultz | |
| 3,811,215 A | 5/1974 | Fleischer | |
| 3,848,480 A | 11/1974 | Oseroff et al. | |
| 3,857,745 A | 12/1974 | Grausch et al. | |
| 3,876,320 A | 4/1975 | Phillipson | |
| 3,883,978 A | 5/1975 | Ohmura | |
| 3,922,402 A | 11/1975 | Shimamura et al. | |
| 3,964,340 A | 6/1976 | Antonio et al. | |
| 3,973,348 A | 8/1976 | Shell | |
| 3,975,855 A | 8/1976 | McKeown | |
| 3,992,021 A | 11/1976 | Tobin | |
| 4,012,039 A | 3/1977 | Yerke | |
| 4,015,851 A | 4/1977 | Pennell | |
| 4,050,179 A | 9/1977 | Johnson | |
| 4,052,061 A | 10/1977 | Stewart | |
| 4,052,768 A * | 10/1977 | Yamazaki | G05G 1/085 16/441 |
| 4,053,676 A | 10/1977 | Kaminstein | |
| 4,083,141 A | 4/1978 | Shedd et al. | |
| 4,117,568 A * | 10/1978 | Bullock | G05G 1/085 16/110.1 |
| 4,133,529 A | 1/1979 | Gambino | |
| 4,137,360 A | 1/1979 | Reischl | |
| 4,138,075 A * | 2/1979 | Korten | A01K 89/006 242/283 |
| 4,155,517 A * | 5/1979 | Sazaki | A01K 89/009 242/284 |
| 4,195,837 A * | 4/1980 | Poulin | A63B 49/08 473/298 |
| 4,216,251 A | 8/1980 | Nishimura et al. | |
| 4,220,054 A * | 9/1980 | Kuhlman | G05G 1/085 16/441 |
| 4,250,135 A | 2/1981 | Orsini | |
| 4,261,567 A | 4/1981 | Uffindell | |
| 4,284,275 A | 8/1981 | Fletcher | |
| 4,347,280 A | 8/1982 | Lau et al. | |
| 4,358,499 A | 11/1982 | Hill | |
| 4,373,718 A | 2/1983 | Schmidt | |
| 4,398,369 A | 8/1983 | Wiebe | |
| 4,448,922 A | 5/1984 | McCartney | |
| 4,453,332 A | 6/1984 | Wightman | |
| 4,485,580 A | 12/1984 | Ohmura | |
| 4,524,484 A | 6/1985 | Graham | |
| 4,535,561 A | 8/1985 | Hlava | |
| 4,535,649 A | 8/1985 | Stahel | |
| 4,559,735 A | 12/1985 | Batick, Jr. | |
| 4,582,459 A | 4/1986 | Benit | |
| 4,613,537 A | 9/1986 | Krüpper | |
| 4,637,157 A | 1/1987 | Collins | |
| 4,646,460 A | 3/1987 | Rumbaugh | |
| 4,648,196 A | 3/1987 | Moody | |
| 4,651,461 A | 3/1987 | Williams | |
| 4,651,991 A | 3/1987 | McDuff | |
| 4,662,415 A | 5/1987 | Proutt | |
| 4,697,377 A | 10/1987 | Martin | |
| 4,702,032 A | 10/1987 | Ohmura | |
| 4,738,046 A | 4/1988 | Fraylick et al. | |
| 4,747,227 A | 5/1988 | Kress | |
| 4,765,856 A | 8/1988 | Doubt | |
| 4,821,447 A | 4/1989 | Nakayama et al. | |
| 4,830,306 A * | 5/1989 | Tsunoda | A01K 89/01 242/316 |
| 4,839,981 A | 6/1989 | Yasui | |
| 4,845,882 A | 7/1989 | Collins | |
| 4,850,130 A * | 7/1989 | Childre | A01K 87/08 43/23 |
| 4,864,764 A | 9/1989 | Yamato | |
| 4,878,667 A | 11/1989 | Tosti | |
| 4,919,420 A | 4/1990 | Sato | |
| 4,941,232 A | 7/1990 | Decker et al. | |
| 4,971,837 A | 11/1990 | Martz et al. | |
| 5,024,866 A | 6/1991 | Goode | |
| 5,055,340 A | 10/1991 | Matsumura et al. | |
| 5,088,225 A | 2/1992 | Yamamoto | |
| 5,118,107 A | 6/1992 | Bucher | |
| 5,123,646 A | 6/1992 | Overby et al. | |
| 5,127,650 A | 7/1992 | Schneller | |
| 5,145,210 A | 9/1992 | Lennon | |
| 5,150,853 A * | 9/1992 | Bernard | A01K 89/006 242/283 |
| 5,220,707 A | 6/1993 | Newman, Sr. et al. | |
| 5,261,665 A | 11/1993 | Downey | |
| 5,266,991 A * | 11/1993 | McAtee, Jr. | G02B 7/28 396/144 |
| 5,322,290 A | 6/1994 | Minami | |
| 5,330,603 A | 7/1994 | Payne | |
| 5,343,776 A | 9/1994 | Falco | |
| 5,374,059 A | 12/1994 | Huang | |
| 5,396,727 A | 3/1995 | Furuya et al. | |
| 5,427,376 A | 6/1995 | Cummings et al. | |
| 5,461,818 A | 10/1995 | Balkcom | |
| 5,469,601 A | 11/1995 | Jackson | |
| 5,474,802 A | 12/1995 | Shimoda et al. | |
| 5,480,146 A | 1/1996 | Comer | |
| 5,485,996 A | 1/1996 | Niksich | |
| 5,503,579 A | 4/1996 | Curran et al. | |
| 5,511,445 A | 4/1996 | Hildebrandt | |
| D369,641 S | 5/1996 | Asano et al. | |
| 5,522,169 A | 6/1996 | Heller | |
| 5,523,125 A | 6/1996 | Kennedy et al. | |
| 5,535,539 A | 7/1996 | Vetre | |
| 5,537,773 A | 7/1996 | Matsubara et al. | |
| D373,404 S * | 9/1996 | Atherton | A01K 89/01 D22/140 |
| 5,557,875 A | 9/1996 | Testa | |
| 5,570,884 A | 11/1996 | Carps | |

(56) References Cited

U.S. PATENT DOCUMENTS

| | | | |
|---|---|---|---|
| 5,571,050 A | 11/1996 | Huang | |
| 5,577,722 A | 11/1996 | Glassberg | |
| 5,584,482 A | 12/1996 | Huang | |
| 5,595,544 A | 1/1997 | Roelke | |
| 5,611,533 A | 3/1997 | Williams | |
| 5,624,116 A | 4/1997 | Yeh | |
| 5,626,527 A | 5/1997 | Eberlein | |
| 5,634,859 A | 6/1997 | Nesbitt | |
| 5,636,560 A | 6/1997 | Paul | |
| 5,645,501 A | 7/1997 | Huang | |
| 5,653,643 A | 8/1997 | Falone et al. | |
| 5,660,344 A * | 8/1997 | Testa | A01K 89/009 242/283 |
| 5,671,923 A | 9/1997 | Huang | |
| 5,690,566 A | 11/1997 | Bracho | |
| 5,695,418 A | 12/1997 | Huang | |
| 5,697,184 A | 12/1997 | Heller | |
| 5,730,662 A | 3/1998 | Rens | |
| 5,730,669 A | 3/1998 | Huang | |
| 5,732,602 A * | 3/1998 | Schwartz | B25F 5/006 16/431 |
| 5,743,577 A | 4/1998 | Newman, Jr. et al. | |
| 5,753,568 A | 5/1998 | Shimano et al. | |
| 5,766,720 A | 6/1998 | Yamagishi et al. | |
| 5,771,552 A | 6/1998 | Karner et al. | |
| 5,772,524 A | 6/1998 | Huang | |
| 5,781,963 A * | 7/1998 | Maru | B25G 1/105 16/430 |
| 5,797,813 A | 8/1998 | Huang | |
| 5,803,828 A | 9/1998 | Huang | |
| 5,813,921 A | 9/1998 | Huang | |
| 5,816,933 A | 10/1998 | Huang | |
| 5,816,934 A | 10/1998 | Huang | |
| 5,827,129 A | 10/1998 | Huang | |
| 5,839,983 A | 11/1998 | Kramer | |
| 5,851,632 A | 12/1998 | Chen et al. | |
| 5,857,929 A | 1/1999 | Huang | |
| 5,867,868 A | 2/1999 | Ward | |
| 5,890,260 A | 4/1999 | Gaunt | |
| 5,890,313 A | 4/1999 | Collins | |
| 5,890,972 A | 4/1999 | Huang | |
| 5,895,329 A | 4/1999 | Huang | |
| 5,910,054 A | 6/1999 | Huang | |
| 5,921,488 A * | 7/1999 | Degrenier | A01K 89/0102 242/238 |
| 5,924,941 A | 7/1999 | Hagey | |
| 5,934,587 A * | 8/1999 | Yamaguchi | A01K 89/006 242/283 |
| 5,960,578 A | 10/1999 | Yasui | |
| 5,997,421 A | 12/1999 | Huang | |
| 6,022,278 A | 2/2000 | Vela | |
| 6,036,607 A | 3/2000 | Finegan | |
| 6,048,275 A | 4/2000 | Gedeon | |
| 6,067,740 A | 5/2000 | Alley | |
| 6,112,618 A | 9/2000 | Yates | |
| 6,115,955 A | 9/2000 | Sledge | |
| 6,148,482 A | 11/2000 | Maraman, Jr. | |
| 6,197,392 B1 | 3/2001 | Jones | |
| D443,019 S * | 5/2001 | Kang | A01K 89/01 D22/141 |
| 6,226,836 B1 | 5/2001 | Yasui | |
| 6,230,341 B1 | 5/2001 | Dudley | |
| 6,244,975 B1 | 6/2001 | Huang | |
| 6,261,191 B1 | 7/2001 | Chen | |
| 6,314,617 B1 | 11/2001 | Hastings | |
| 6,357,165 B1 | 3/2002 | Lu | |
| 6,360,475 B1 | 3/2002 | Lepage et al. | |
| 6,361,450 B1 | 3/2002 | Huang | |
| 6,381,898 B1 | 5/2002 | Lee | |
| 6,386,989 B1 | 5/2002 | Huang | |
| 6,438,890 B1 | 8/2002 | Yamamoto et al. | |
| D463,520 S | 9/2002 | Ulrich | |
| 6,449,803 B1 | 9/2002 | McConchie | |
| 6,503,153 B2 | 1/2003 | Wang | |
| 6,506,128 B1 | 1/2003 | Bloom, Jr. | |
| 6,511,732 B1 | 1/2003 | Chao | |
| 6,551,198 B2 | 4/2003 | Huang | |
| 6,558,270 B2 | 5/2003 | Kwitek | |
| 6,610,382 B1 | 8/2003 | Kobe et al. | |
| 6,627,027 B2 | 9/2003 | Huang | |
| 6,629,382 B2 | 10/2003 | Irrgang et al. | |
| 6,629,901 B2 | 10/2003 | Huang | |
| 6,635,688 B2 | 10/2003 | Simpson | |
| 6,641,488 B2 | 11/2003 | Huang | |
| 6,652,398 B2 | 11/2003 | Falone et al. | |
| 6,656,054 B2 | 12/2003 | Ulrich | |
| 6,656,057 B2 | 12/2003 | Manual et al. | |
| 6,663,500 B2 | 12/2003 | Huang | |
| 6,666,777 B1 | 12/2003 | Lamkin et al. | |
| 6,676,534 B2 | 1/2004 | Huang | |
| 6,695,713 B2 | 2/2004 | Huang | |
| 6,709,346 B1 | 3/2004 | Wang | |
| 6,733,401 B1 | 5/2004 | Huang | |
| 6,762,243 B2 | 7/2004 | Stender et al. | |
| 6,815,028 B2 | 11/2004 | Huang | |
| 6,827,656 B1 | 12/2004 | Hoeflich et al. | |
| 6,843,732 B1 | 1/2005 | Huang | |
| 6,846,759 B1 | 1/2005 | Copperwheat | |
| 6,855,651 B2 | 2/2005 | Yu | |
| 6,857,971 B2 | 2/2005 | Huang | |
| 6,887,061 B2 | 5/2005 | Donovan et al. | |
| 6,908,400 B2 * | 6/2005 | Chu | A63B 53/14 473/303 |
| 6,973,750 B1 | 12/2005 | Kim | |
| 6,974,626 B2 | 12/2005 | Horacek | |
| 7,008,582 B2 | 3/2006 | Chen | |
| 7,025,690 B2 | 4/2006 | Nam | |
| 7,048,644 B2 | 5/2006 | Wang | |
| D524,390 S | 7/2006 | Tuerschmann | |
| 7,137,904 B2 | 11/2006 | Huang | |
| 7,140,973 B2 | 11/2006 | Rohrer | |
| D534,602 S | 1/2007 | Norton et al. | |
| D534,603 S | 1/2007 | Norton et al. | |
| D534,604 S | 1/2007 | Norton et al. | |
| D534,605 S | 1/2007 | Norton et al. | |
| D534,607 S | 1/2007 | Norton et al. | |
| D534,975 S | 1/2007 | Norton et al. | |
| D536,048 S | 1/2007 | Chen | |
| 7,159,355 B2 | 1/2007 | Ohmura | |
| D538,868 S | 3/2007 | Norton et al. | |
| D538,869 S | 3/2007 | Wang et al. | |
| 7,186,189 B2 | 3/2007 | Huang | |
| 7,195,568 B2 | 3/2007 | Huang | |
| 7,219,395 B2 | 5/2007 | Bigolin | |
| D547,406 S | 7/2007 | Noyes et al. | |
| 7,344,447 B2 | 3/2008 | Chang | |
| 7,344,448 B2 | 3/2008 | Huang | |
| 7,347,792 B2 | 3/2008 | Huang | |
| 7,374,498 B2 | 5/2008 | Huang | |
| 7,404,770 B2 | 7/2008 | Huang | |
| D576,240 S | 9/2008 | Chen | |
| D576,241 S | 9/2008 | Chen | |
| D579,075 S | 10/2008 | Sekimoto et al. | |
| 7,438,646 B2 | 10/2008 | Huang | |
| D581,001 S | 11/2008 | Chen | |
| D581,002 S | 11/2008 | Chen | |
| 7,448,957 B2 | 11/2008 | Huang | |
| 7,448,958 B2 | 11/2008 | Huang | |
| 7,458,903 B2 * | 12/2008 | Wang | A63B 53/14 473/300 |
| 7,470,199 B2 | 12/2008 | Huang | |
| 7,491,133 B2 | 2/2009 | Huang | |
| D590,465 S | 4/2009 | Chen | |
| 7,527,564 B2 | 5/2009 | Huang | |
| 7,566,375 B2 | 7/2009 | Huang | |
| 7,585,230 B2 | 9/2009 | Huang | |
| 7,614,577 B2 * | 11/2009 | Ochiai | A01K 89/006 242/283 |
| 7,621,067 B2 | 11/2009 | Ito | |
| D609,772 S | 2/2010 | Tohma et al. | |
| D616,516 S | 5/2010 | Chen | |
| 7,749,094 B2 | 7/2010 | Chen | |
| 7,770,321 B2 | 8/2010 | Huang | |

(56) References Cited

U.S. PATENT DOCUMENTS

| | | | |
|---|---|---|---|
| D631,118 S | 1/2011 | Chen | |
| 7,862,445 B2 | 1/2011 | Huang | |
| 7,862,446 B2 | 1/2011 | Huang | |
| D634,803 S | 3/2011 | Chen | |
| 7,980,961 B2 | 7/2011 | Huang | |
| 8,003,171 B2 | 8/2011 | Huang | |
| 8,123,627 B2 | 2/2012 | Huang | |
| D661,774 S | 6/2012 | Nago et al. | |
| 8,201,357 B2 | 6/2012 | Huang | |
| 8,360,898 B2 | 1/2013 | Huang | |
| 8,424,236 B2 | 4/2013 | Huang | |
| 8,464,609 B2 | 6/2013 | Shiu et al. | |
| 8,499,487 B2 | 8/2013 | Huang | |
| 8,518,505 B2 | 8/2013 | Huang | |
| 8,590,205 B2 | 11/2013 | Huang | |
| D695,379 S | 12/2013 | Kano et al. | |
| 8,617,664 B2 | 12/2013 | Huang | |
| 8,845,448 B2 | 9/2014 | Huang | |
| D724,174 S | 3/2015 | Nago | |
| 8,966,809 B2 | 3/2015 | Huang | |
| 9,114,295 B2 | 8/2015 | Huang | |
| 9,440,128 B2 | 9/2016 | Huang | |
| 9,598,099 B2 * | 3/2017 | Bertani | B25G 1/046 |
| D788,256 S * | 5/2017 | Savakis | A01K 89/01 D22/140 |
| 9,661,833 B2 | 5/2017 | Huang | |
| D802,708 S | 11/2017 | Savakis | |
| 9,827,645 B2 | 11/2017 | Huang | |
| 10,040,091 B2 | 8/2018 | Huang | |
| 10,112,087 B2 | 10/2018 | Huang | |
| D844,744 S | 4/2019 | Huang et al. | |
| D847,298 S | 4/2019 | Huang et al. | |
| 10,349,644 B2 * | 7/2019 | Ikebukuro | A01K 89/006 |
| 2001/0046905 A1 | 11/2001 | Huang | |
| 2002/0028264 A1 | 3/2002 | Hoopman et al. | |
| 2002/0028325 A1 | 3/2002 | Simpson | |
| 2002/0061787 A1 | 5/2002 | Huang | |
| 2002/0123562 A1 | 9/2002 | Stender et al. | |
| 2002/0142858 A1 | 10/2002 | Chen | |
| 2002/0142900 A1 | 10/2002 | Wang | |
| 2002/0151373 A1 | 10/2002 | Beauregard | |
| 2002/0173371 A1 | 11/2002 | Lamkin et al. | |
| 2003/0040384 A1 | 2/2003 | Falone et al. | |
| 2003/0045370 A1 | 3/2003 | Jaw | |
| 2003/0062654 A1 | 4/2003 | Lamkin | |
| 2003/0139223 A1 | 7/2003 | Ulrich et al. | |
| 2003/0148836 A1 | 8/2003 | Falone et al. | |
| 2003/0150081 A1 | 8/2003 | Wang | |
| 2003/0216192 A1 | 11/2003 | Chu | |
| 2003/0228930 A1 | 12/2003 | Huang | |
| 2004/0029645 A1 | 2/2004 | Chen | |
| 2004/0029646 A1 | 2/2004 | Chu et al. | |
| 2004/0031128 A1 | 2/2004 | Chen | |
| 2004/0088900 A1 | 5/2004 | Irrgang et al. | |
| 2004/0109980 A1 | 6/2004 | Chen et al. | |
| 2004/0123429 A1 | 7/2004 | Wang | |
| 2004/0185958 A1 | 9/2004 | Huang | |
| 2004/0211108 A1 | 10/2004 | Ezuka | |
| 2004/0248664 A1 | 12/2004 | Billings | |
| 2005/0123723 A1 | 6/2005 | Wang | |
| 2005/0221909 A1 | 10/2005 | Nam | |
| 2005/0229285 A1 | 10/2005 | Chung | |
| 2005/0276925 A1 | 12/2005 | Su | |
| 2005/0282004 A1 | 12/2005 | Jaw | |
| 2005/0287329 A1 | 12/2005 | Lai | |
| 2006/0172815 A1 | 8/2006 | Chu | |
| 2006/0188681 A1 | 8/2006 | Wang | |
| 2006/0230669 A1 | 10/2006 | Markley et al. | |
| 2006/0252571 A1 | 11/2006 | Wang | |
| 2006/0264268 A1 | 11/2006 | Huang | |
| 2006/0287123 A1 | 12/2006 | Wang | |
| 2007/0072696 A1 | 3/2007 | Chen | |
| 2007/0149307 A1 | 6/2007 | Huang | |
| 2007/0167252 A1 | 7/2007 | Jaw | |
| 2008/0014412 A1 | 1/2008 | Hortnagl et al. | |
| 2008/0039226 A1 | 2/2008 | Chi | |
| 2008/0040890 A1 | 2/2008 | Chang | |
| 2008/0120893 A1 | 5/2008 | Keys et al. | |
| 2008/0172839 A1 | 7/2008 | Wang | |
| 2008/0229646 A1 | 9/2008 | Huang | |
| 2008/0244956 A1 | 10/2008 | Gant et al. | |
| 2009/0035543 A1 | 2/2009 | Vito et al. | |
| 2009/0258721 A1 | 10/2009 | Huang | |
| 2010/0281754 A1 | 11/2010 | Huang | |
| 2012/0129624 A1 | 5/2012 | Ito et al. | |
| 2013/0255131 A1 | 10/2013 | Abbey et al. | |
| 2013/0283665 A1 | 10/2013 | Poe et al. | |
| 2014/0366327 A1 | 12/2014 | Huang | |
| 2015/0181851 A1 | 7/2015 | Akiba et al. | |
| 2016/0192629 A1 | 7/2016 | Choi | |
| 2016/0338331 A1 | 11/2016 | Norsworthy | |
| 2017/0013816 A1 | 1/2017 | Huang | |
| 2017/0112113 A1 | 4/2017 | Huang | |
| 2017/0354132 A1 | 12/2017 | Huang | |
| 2018/0154494 A1 | 6/2018 | Huang | |
| 2019/0193106 A1 | 6/2019 | Huang | |
| 2019/0232131 A1 | 8/2019 | Huang | |

FOREIGN PATENT DOCUMENTS

| | | |
|---|---|---|
| CN | 2139008 | 7/1993 |
| CN | 2163667 | 5/1994 |
| CN | 2288744 | 8/1998 |
| CN | 2438768 | 7/2001 |
| CN | 2444645 | 8/2001 |
| CN | 1332022 | 1/2002 |
| CN | 2544761 | 4/2003 |
| CN | 2566903 | 8/2003 |
| CN | 2571437 | 9/2003 |
| CN | 2596752 | 1/2004 |
| CN | 1531983 | 9/2004 |
| CN | 2659497 | 12/2004 |
| DE | 36 44 674 | 7/1988 |
| DE | 92 18 550 | 8/1994 |
| DE | 20 2013 008 537 | 1/2014 |
| EP | 0 391 166 | 10/1990 |
| EP | 0 633 113 | 1/1995 |
| EP | 1 435 256 | 1/2003 |
| EP | 1 371 397 | 12/2003 |
| EP | 1 464 365 A2 | 10/2004 |
| EP | 1 464 365 A3 | 11/2004 |
| EP | 1 738 808 | 1/2007 |
| EP | 2 888 939 | 3/2019 |
| FR | 2 731 402 | 9/1996 |
| GB | 1 251 360 | 10/1971 |
| GB | 2 017 471 | 10/1979 |
| GB | 2 192 550 | 1/1988 |
| GB | 2 264 062 | 8/1993 |
| JP | 57-111689 | 12/1955 |
| JP | 53-012061 | 2/1978 |
| JP | 55-043008 | 3/1980 |
| JP | 60-061067 | 4/1985 |
| JP | 03-112575 | 5/1991 |
| JP | 04-077250 | 3/1992 |
| JP | 07-041731 | 2/1995 |
| JP | 3010205 | 2/1995 |
| JP | 09-056850 | 3/1997 |
| JP | 09-275858 | 10/1997 |
| JP | 3061769 | 6/1999 |
| JP | 2000-093050 | 4/2000 |
| JP | 3076015 | 12/2000 |
| JP | 2001-057831 | 3/2001 |
| JP | 2001-120125 | 5/2001 |
| JP | 2001-157533 | 6/2001 |
| JP | 3081404 | 8/2001 |
| JP | 2001-269088 | 10/2001 |
| JP | 2001-275523 | 10/2001 |
| JP | 2002-028264 | 1/2002 |
| JP | 2002-119180 | 4/2002 |
| JP | 2002-125534 | 5/2002 |
| JP | 2002-218869 | 8/2002 |
| JP | 2003-070396 | 3/2003 |
| JP | 2003-274813 | 9/2003 |
| JP | 2004-201570 | 7/2004 |

(56) References Cited

FOREIGN PATENT DOCUMENTS

| JP | 2004-222655 | 8/2004 |
|---|---|---|
| JP | 2004-236515 | 8/2004 |
| JP | 2005-130767 | 5/2005 |
| JP | 2005-177464 | 7/2005 |
| JP | 2008-245645 | 10/2005 |
| JP | 2006-204261 | 8/2006 |
| JP | 2006-223186 | 8/2006 |
| JP | 2006-254822 | 9/2006 |
| JP | 2007-195489 | 8/2007 |
| JP | 2008-017711 | 1/2008 |
| JP | 2008-029297 | 2/2008 |
| JP | 2008-029298 | 2/2008 |
| JP | 2009-219408 | 10/2009 |
| JP | 2009-240251 | 10/2009 |
| JP | 2010-273587 | 12/2010 |
| JP | 2011-067122 | 4/2011 |
| JP | 5506161 | 5/2014 |
| JP | 6210740 | 10/2017 |
| JP | 6543554 | 7/2019 |
| KR | 10-2007-0078047 | 7/2007 |
| KR | 10-2008-0112484 | 12/2008 |
| TW | 194957 | 1/1992 |
| TW | 200400843 | 1/2004 |
| TW | M321797 | 11/2007 |
| TW | M350370 | 2/2009 |
| WO | WO 2005/115563 | 12/2005 |

OTHER PUBLICATIONS

Photo of the inner surface of a white felt layer with polyurethane layered on an outer surface thereof taken Feb. 14, 2013.
The Random House College Dictionary, Revised Edition, 1975, p. 1233, definition of Skive.
Zosel, A. "Adhesion and Tack of Polymers: Influence of Mechanical Properties and Surface Tension", Colloid & Polymer Science, 1985, vol. 263, No. 7, pp. 541-553.
U.S. Appl. No. 09/901,747, filed Jul. 9, 2001, Huang, (U.S. Pub. No. 2001/0046905, published Nov. 29, 2001), abandoned.
U.S. Appl. No. 10/167,216, filed Jun. 11, 2002, now U.S. Pat. No. 7,137,904, issued Nov. 21, 2006, Huang.
U.S. Appl. No. 10/348,389, filed Jan. 21, 2003, now U.S. Pat. No. 6,733,401, issued May 11, 2004, Huang.
U.S. Appl. No. 10/392,480, filed Mar. 18, 2003, now U.S. Pat. No. 6,857,971, issued Feb. 22, 2005, Huang.
U.S. Appl. No. 10/608,598, filed Jun. 27, 2003, Huang (U.S. Pub. No. 2004-0266546, published Dec. 30, 2004), abandoned.
U.S. Appl. No. 10/746,764, filed Dec. 23, 2003, now U.S. Pat. No. 6,843,732, issued Jan. 18, 2005, Huang.
U.S. Appl. No. 10/785,379, filed Feb. 24, 2004, now U.S. Pat. No. 7,374,498, issued May 20, 2008, Huang.
U.S. Appl. No. 10/827,095, filed Apr. 19, 2004, now U.S. Pat. No. 7,195,568, issued Mar. 27, 2007, Huang.
U.S. Appl. No. 10/875,035, filed Jun. 23, 2004, now U.S. Pat. No. 7,585,230, issued Sep. 8, 2009, Huang.
U.S. Appl. No. 11/029,328, filed Jan. 5, 2005, now U.S. Publication No. 2005/0148401 published Jul. 7, 2005, Huang (Abandoned).
U.S. Appl. No. 11/062,046, filed Feb. 18, 2005, now U.S. Pat. No. 7,470,199, issued Dec. 30, 2008, Huang.
U.S. Appl. No. 11/131,832, filed May 18, 2005, now U.S. Pat. No. 7,527,564, issued May 5, 2009, Huang.
U.S. Appl. No. 11/172,770, filed Jul. 1, 2005, now U.S. Pat. No. 7,186,189, issued Mar. 6, 2007, Huang.
U.S. Appl. No. 11/412,196, filed Apr. 25, 2006, now U.S. Pub. No. 2006/0264268 published Nov. 23, 2006), Huang (Abandoned).
U.S. Appl. No. 11/413,411, filed Apr. 28, 2006, now U.S. Pat. No. 7,344,448, issued Mar. 18, 2008, Huang.
U.S. Appl. No. 11/416,364, filed May 1, 2006, now U.S. Pat. No. 7,438,646, issued Oct. 21, 2008, Huang.
U.S. Appl. No. 11/417,401, filed May 3, 2006, now U.S. Pat. No. 7,491,133, issued Feb. 17, 2009, Huang.
U.S. Appl. No. 11/417,555, filed May 3, 2006, now U.S. Pat. No. 7,404,770, issued Jul. 29, 2008, Huang.
U.S. Appl. No. 11/417,623, filed May 3, 2006, now U.S. Pat. No. 7,566,375, issued Jul. 28, 2009, Huang.
U.S. Appl. No. 11/417,643, filed May 3, 2006, now U.S. Pat. No. 7,448,957, issued Nov. 11, 2008, Huang.
U.S. Appl. No. 11/417,696, filed Mar. 5, 2006, now U.S. Pat. No. 7,448,958, issued Nov. 11, 2008, Huang.
U.S. Appl. No. 11/438,808, filed May 22, 2006, now U.S. Pat. No. 7,347,792, issued Mar. 25, 2008, Huang.
U.S. Appl. No. 11/682,264, filed Mar. 5, 2007, now U.S. Pat. No. 7,980,961, issued Jul. 19, 2011, Huang.
U.S. Appl. No. 11/689,452, filed Mar. 21, 2007, now U.S. Pat. No. 7,862,445, issued Jan. 4, 2011, Huang.
U.S. Appl. No. 11/838,670, filed Aug. 14, 2007, now U.S. Pat. No. 7,862,446, issued Jan. 4, 2011, Huang.
U.S. Appl. No. 12/045,639, filed Mar. 10, 2008, now U.S. Pat. No. 7,770,321, issued Aug. 10, 2010, Huang.
U.S. Appl. No. 12/055,289, filed Mar. 25, 2008, now U.S. Pat. No. 8,003,171, issued Aug. 23, 2011, Huang.
U.S. Appl. No. 12/123,384, filed May 19, 2008, now U.S. Pat. No. 7,985,314, issued Jul. 26, 2011, Huang.
U.S. Appl. No. 12/425,187, filed Apr. 16, 2009, now U.S. Publication No. 2009/0258722 published Oct. 15, 2009, Huang (Abandoned).
U.S. Appl. No. 12/426,896, filed Apr. 20, 2009, now U.S. Publication No. 2009-0258721 published Oct. 15, 2009, Huang (Abandoned).
U.S. Appl. No. 12/511,033, filed Jul. 28, 2009, now U.S. Pat. No. 8,435,133, issued May 7, 2013, Huang.
U.S. Appl. No. 12/753,669, filed Apr. 2, 2010, now U.S. Pat. No. 8,518,505, issued Aug. 27, 2013, Huang.
U.S. Appl. No. 12/753,773, filed Apr. 2, 2010, now U.S. Pat. No. 8,424,236, issued Apr. 23, 2013, Huang.
U.S. Appl. No. 12/753,799, filed Apr. 2, 2010, Huang (U.S. Pub. 2010-0273568, published Oct. 28, 2010), abandoned.
U.S. Appl. No. 12/753,804, filed Apr. 2, 2010, Huang (U.S. Pub. 2010-0269626, published Oct. 28, 2010), pending.
U.S. Appl. No. 12/767,736, filed Apr. 26, 2010, now U.S. Pat. No. 8,360,898, issued Jan. 29, 2013, Huang.
U.S. Appl. No. 12/848,052, filed Jul. 30, 2010, now U.S. Pat. No. 8,201,357, issued Jun. 19, 2012, Huang.
U.S. Appl. No. 12/862,673, filed Aug. 24, 2010, now U.S. Pat. No. 8,480,510, issued Jul. 9, 2013, Huang.
U.S. Appl. No. 12/948,637, filed Nov. 17, 2010, now U.S. Pat. No. 8,590,205, issued Nov. 26, 2013, Huang.
U.S. Appl. No. 12/960,261, filed Dec. 03, 2010, now U.S. Pat. No. 8,123,627, issued Feb. 28, 2012, Huang.
U.S. Appl. No. 13/208,297, filed Aug. 11, 2011, now U.S. Pat. No. 8,617,664, issued Dec. 31, 2013, Huang.
U.S. Appl. No. 13/403,764, filed Feb. 23, 2012, now U.S. Pat. No. 8,845,448, issued Sep. 30, 2014, Huang.
U.S. Appl. No. 13/526,323, filed Jun. 18, 2012, now U.S. Pat. No. 8,499,487, issued Aug. 6, 2013, Huang.
U.S. Appl. No. 13/750,853, filed Jan. 25, 2013, now U.S. Pat. No. 9,114,295, issued Aug. 25, 2015, Huang.
U.S. Appl. No. 13/866,911, filed Apr. 19, 2013, now U.S. Pat. No. 8,966,809, issued Mar. 3, 2015, Huang.
U.S. Appl. No. 13/874,889, filed May 1, 2013, Huang (U.S. Pub. 2014-0041794, published Feb. 13, 2014), pending.
U.S. Appl. No. 13/916,519, filed Jun. 12, 2013, Huang, pending.
U.S. Appl. No. 13/931,647, filed Jun. 28, 2013, now U.S. Pat. No. 8,734,267, issued May 27, 2014, Huang.
U.S. Appl. No. 13/958,211, filed Aug. 2, 2013, Huang, abandoned.
U.S. Appl. No. 13/972,751, filed Aug. 21, 2013, now U.S. Pat. No. 9,661,833, issued May 30, 2017, Huang.
U.S. Appl. No. 14/137,735, filed Dec. 20, 2013, now U.S. Patent No. 10,040,091, issued Aug. 7, 2018, Huang.
U.S. Appl. No. 14/285,390, filed May 22, 2014, now U.S. Pat. No. 9,375,833, issued Jun. 28, 2016, Huang.
U.S. Appl. No. 14/497,797, filed Sep. 26, 2014, Huang (Abandoned).

(56) References Cited

OTHER PUBLICATIONS

U.S. Appl. No. 14/671,745, filed Mar. 27, 2015, Huang, (U.S. Pub. 2015-0273647, published Oct. 1, 2015), pending.
U.S. Appl. No. 14/726,093, filed May 29, 2015, now U.S. Pat. No. 9,440,128, issued Apr. 21, 2016, Huang.
U.S. Appl. No. 14/809,072, filed Jul. 24, 2015, Huang, pending.
U.S. Appl. No. 15/188,388, filed Jun. 21, 2016, Huang, abandoned.
U.S. Appl. No. 15/191,125, filed Jun. 23, 2016, now U.S. Publication No. 2017/0013816 published Jan. 19, 2017, Huang.
U.S. Appl. No. 15/191,453, filed Jun. 23, 2016, now U.S. Publication No. 2017/0112113 published Apr. 27, 2017, Huang.
U.S. Appl. No. 15/261,758, filed Sep. 9, 2016, now U.S. Pat. No. 10,112,087, issued Oct. 30, 2018, Huang.
U.S. Appl. No. 29/416,672, filed Mar. 26, 2012, now U.S. D679,352, issued Apr. 2, 2013, Huang.
U.S. Appl. No. 29/436,610, filed Nov. 7, 2012, now U.S. DES696,368, issued Dec. 24, 2013, Huang.
U.S. Appl. No. 29/602,815, filed May 3, 2017, now U.S. D844,744, issued Apr. 02, 2019, Huang.
U.S. Appl. No. 29/604,651, filed May 18, 2017, now U.S. D847,298, issued Apr. 30, 2019, Huang.
European Search Report received in European Application No. 10250739.9, dated Sep. 21, 2010.
Official Communication received in Taiwan Application No. 099111165, dated Mar. 24, 2016.
European Search Report received in European Application No. 10250730.8, dated Sep. 21, 2010.
European Search Report received in European Application No. 16179413.6, dated Dec. 20, 2016.
European Search Report received in European Application No. 16179416.9, dated Dec. 20, 2016.
Partial European Search Report received in European Application No. 03255917.1, dated Jul. 23, 2004.

* cited by examiner

REEL COMPONENT AND METHOD OF MANUFACTURING SAME

CROSS-REFERENCE TO RELATED APPLICATIONS

The present application is a continuation-in-part of U.S. Design application Ser. No. 29/602,815, filed May 3, 2017, (entitled "REEL COMPONENT") and a continuation-in-part of U.S. Design application Ser. No. 29/604,651, filed May 18, 2017 (entitled "REEL COMPONENT"), the entireties of each of which are incorporated by reference herein.

BACKGROUND

Field

Certain embodiments disclosed herein relate to fishing poles and the construction of certain components thereof, as well as the incorporation of reel knobs with an improved gripping surface.

Description of Certain Related Art

The grips used for various activities wear out over time. Most modern grips have retained a historical cylindrical design. In addition, many grips are made of cork, as cork is light, durable, and transmits rod vibrations fairly well. However, cork is also a fairly hard material, which may be uncomfortable to hold during a long fishing trip. EVA and PVC foams are consequently used in place of cork, but grips incorporating these foams also tend to be stiff and uncomfortable to hold for long periods of time. The stiffness and shape of currently available grips can cause strain on the hands and arms. This is particularly evident as fishers often hold a fishing pole for a long period of time. In some instances, such as in deep sea fishing, fishers may hold the rod for a significant number of minutes or even hours. In particular, fishers may often grasp one or more knobs of a reel handle for a long period of time or during high stress situations. For example, fighting a fish can cause strain to a fisher. Some fish, such as sharks, are heavy and fight long and vigorously. Moreover, people fish in many different environments that may contribute to further strain.

Thus, there remains a need for a grip apparatus and method to affix a new grip to a reel knob of a reel handle and/or replace worn out or undesirable grips of a reel knob.

SUMMARY

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

According to some embodiments, a reel knob of a fishing reel includes a base defining an underlisting and a gripping member comprising a resilient material. The base can include a side wall; a top wall forming an exposed end; a fastener hole defining an opening in the top wall; and a recessed area. The recessed area can include a lip that surrounds at least a portion of the recessed area and is configured to protect the exposed end. The recessed area can extend along at least a portion of the side wall and the top wall. The recessed area can surround the fastener hole along the top wall. The gripping member is shaped to correspond to the recessed area of the base. The gripping member is adhered to the recessed area of the base such that the gripping member fills at least a portion of the recessed area.

In some embodiments, the recessed area extends along a first side and a second side of the side wall. In some embodiments, a surface of the gripping member is approximately aligned with a surface of the base to create a smooth transition from the surface of the gripping member to the surface of the base. In some embodiments, a surface of the gripping member is positioned inwardly from a surface of the base. In some embodiments, the base further comprises a bottom wall, wherein the recessed area does not extend along the bottom wall.

In some embodiments, the base further comprises a bottom wall configured to be positioned adjacent a reel handle. In some embodiments, the side wall has a maximum width at a first region, wherein a distance between the first region and the bottom wall of the base is greater than a distance between the first region and the top wall of the base. In some embodiments, the distance between the first region and the bottom wall of the base is approximately twice the distance between the first region and the top wall of the base.

In some embodiments, the side wall has a maximum width at a first region, and wherein the maximum width at the first region is greater than a maximum width of the top wall. In some embodiments, the recessed area further includes a side recessed portion extending along a portion of the side wall, an intermediate recessed portion extending along a portion of the side wall, and a central recessed portion extending along the top wall, wherein the intermediate recessed portion transitions between the side recessed portion and the central recessed portion. In some embodiments, the intermediate recessed portion is tapered from the side recessed portion towards the central recessed portion.

In some embodiments, the recessed area is spaced away from a lower edge of the side wall, wherein the lower edge is positioned opposite an upper edge formed between the top wall and the side wall. In some embodiments, the gripping member further comprises a first portion, a central portion, and a second portion, wherein the first portion is connected to the central portion by a first connecting portion and the second portion is connected to the central portion by a second connecting portion. In some embodiments, the first connecting portion has a width that is narrower than a maximum width of the first portion. In some embodiments, the central portion includes an aperture configured to surround the fastener hole. In some embodiments, the resilient material further comprises a polyurethane coating. In some embodiments, a surface of the recessed area extending along the side wall forms a concave surface. In some embodiments, the gripping member includes a pattern configured to increase friction properties of the gripping member.

In some embodiments, a fishing pole includes a fishing reel having the reel knob. In some embodiments, a method of assembling a fishing rod includes providing the fishing reel including the reel knob; and coupling the fishing reel to a reel seat of the fishing pole.

According to some embodiments, a method of manufacturing a reel knob comprises providing a base, providing a gripping member, and pressing the base into the gripping member. The base can define an underlisting. The base can include a side wall; a top wall forming an exposed end; a fastener hole defining an opening in the top wall; and a recessed area. The recessed area can include a lip that surrounds at least a portion of the recessed area. The lip can protect the exposed end. The recessed area can extend along at least a portion of the side wall and the top wall. The recessed area can surround the fastener hole along the top wall. The gripping member can include a resilient material. The gripping member can be shaped to correspond to the recessed area of the base.

In some embodiments, the method of manufacturing can include adhering the gripping member to the recessed area of the base such that the gripping member fills at least a portion of the recessed area.

In some embodiments, the gripping member further includes a first portion, a central portion, and a second portion. The first portion can be connected to the central portion by a first connecting portion and the second portion can be connected to the central portion by a second connecting portion. In some embodiments, the first and second portions wrap onto at least a portion of the base automatically as the base presses into the gripping member. In some embodiments, the first and second portions are pressed automatically onto the base as the base presses into the gripping member. In some embodiments, the central portion of the gripping member includes an aperture. Pressing the base can further include aligning the aperture of the gripping member with the fastener hole of the base.

In some embodiments, the method of manufacturing further includes pressing the first and second portions of the gripping member into the recessed area of the base. In some embodiments, pressing the base further includes pressing the top wall of the base into the central portion of the gripping member. In some embodiments, the first and second portions translate upwardly and inwardly towards the recessed area of the gripping member as the top wall of the base presses into the central portion of the gripping member.

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

DETAILED DESCRIPTION

Overview

Figure 1:
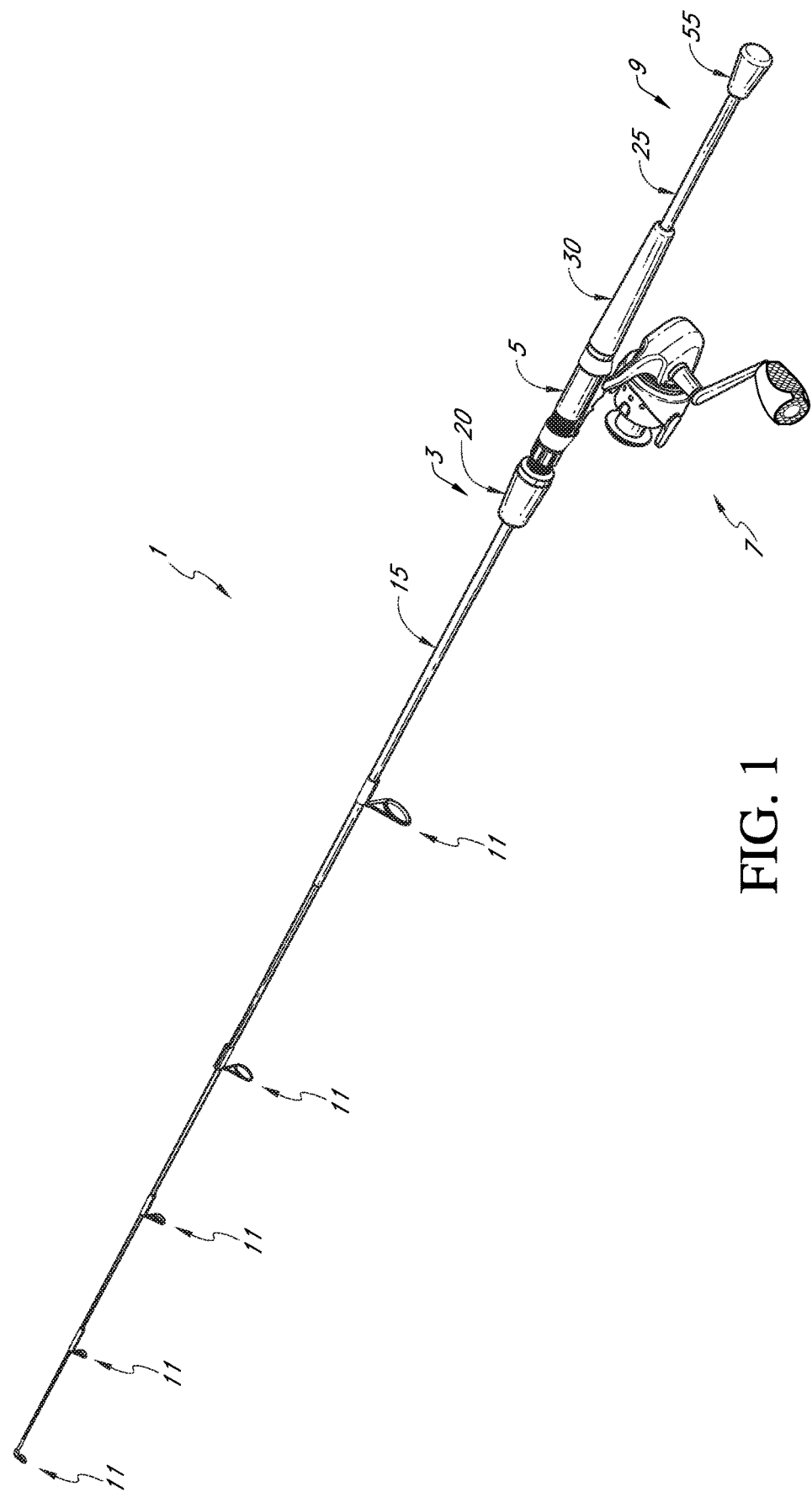
FIG. 1 is a perspective view of an embodiment of a fishing pole.

FIG. 1 depicts a fishing pole 1 including a main rod component 3, a reel seat 5 securing a reel 7, and a handle component 9. The main rod component 3 comprises multiple guides 11 attached to a main shaft 15. The main rod component 3 may also include a fore grip 20. In some embodiments, the main shaft 15 may be made of multiple pieces which may be joined at a ferrule enabling the pole to be broken down. The handle component 9 can include a handle shaft 25 and one or more grips such as a rear grip 30 and a butt grip 55.

Figure 2A:
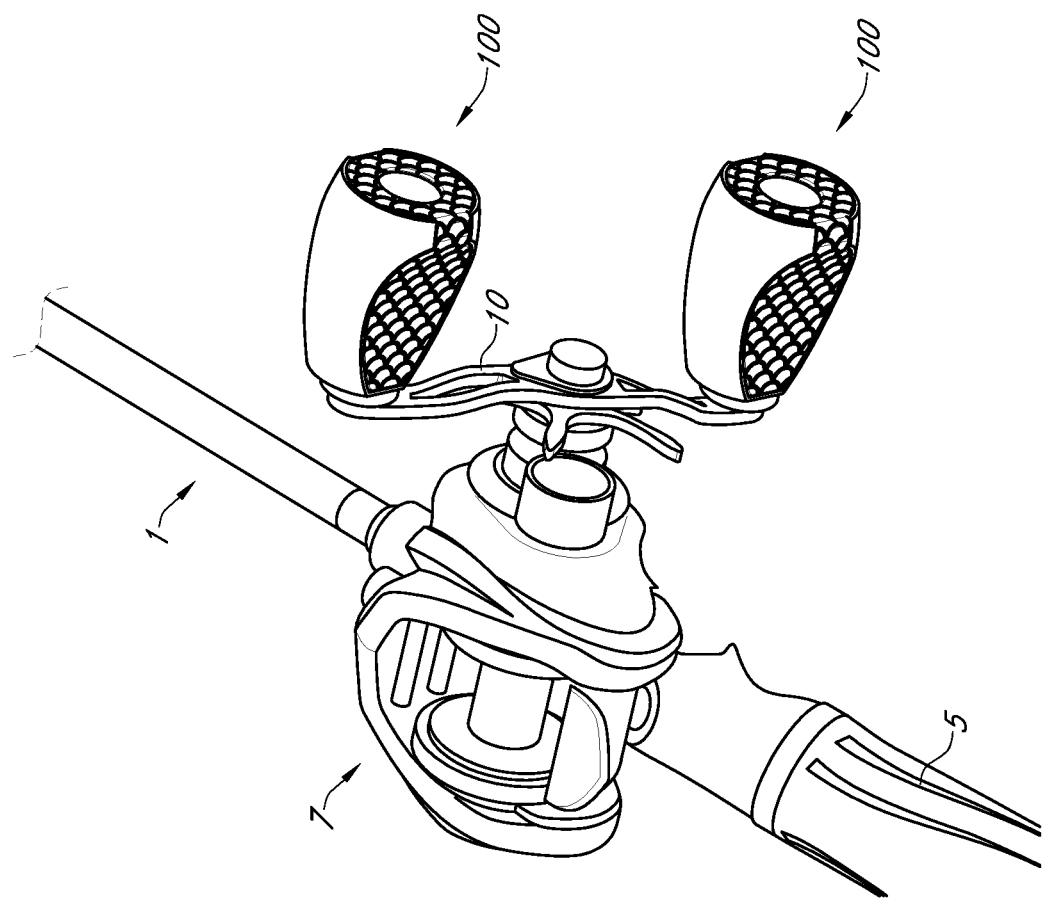
FIG. 2A is a perspective view of a reel assembly of a fishing pole.
Figure 2B:
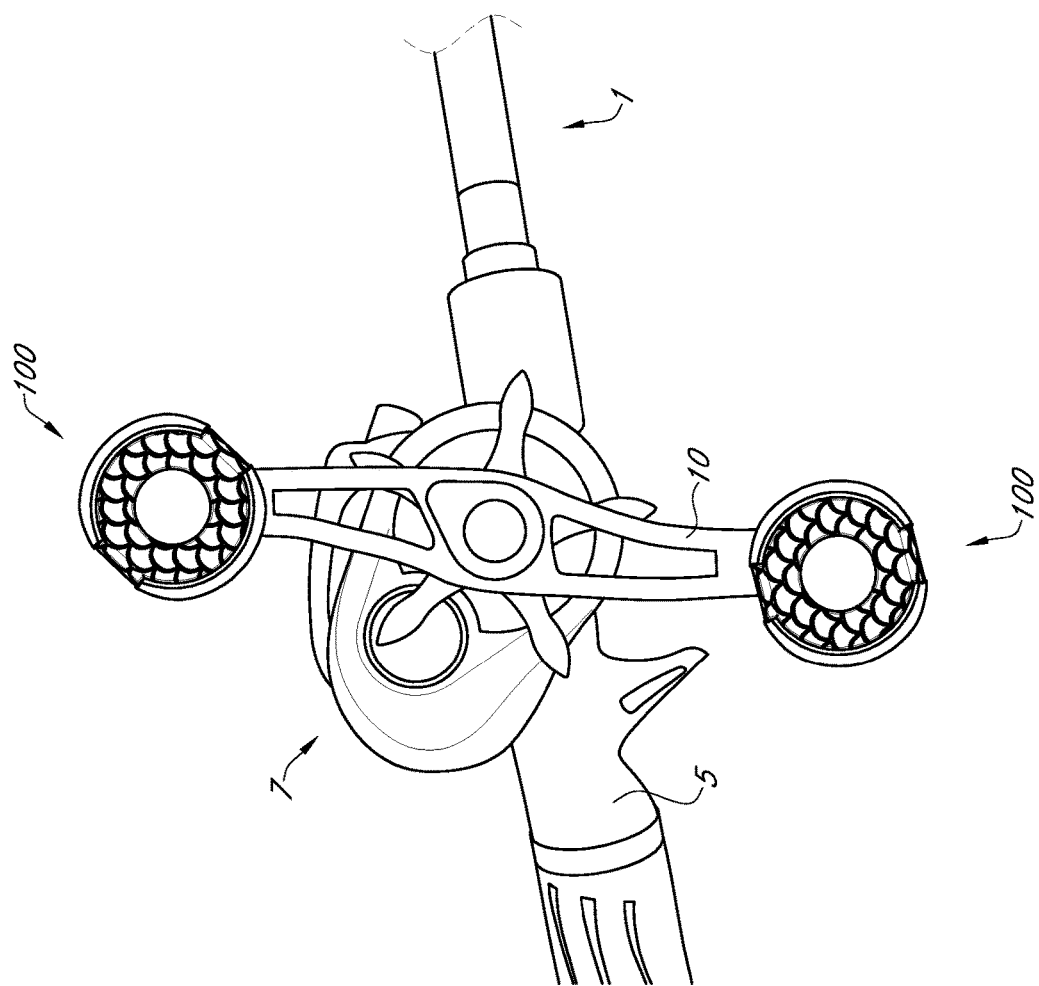
FIG. 2B is a perspective view of a reel assembly of a fishing pole.
Figure 3A:
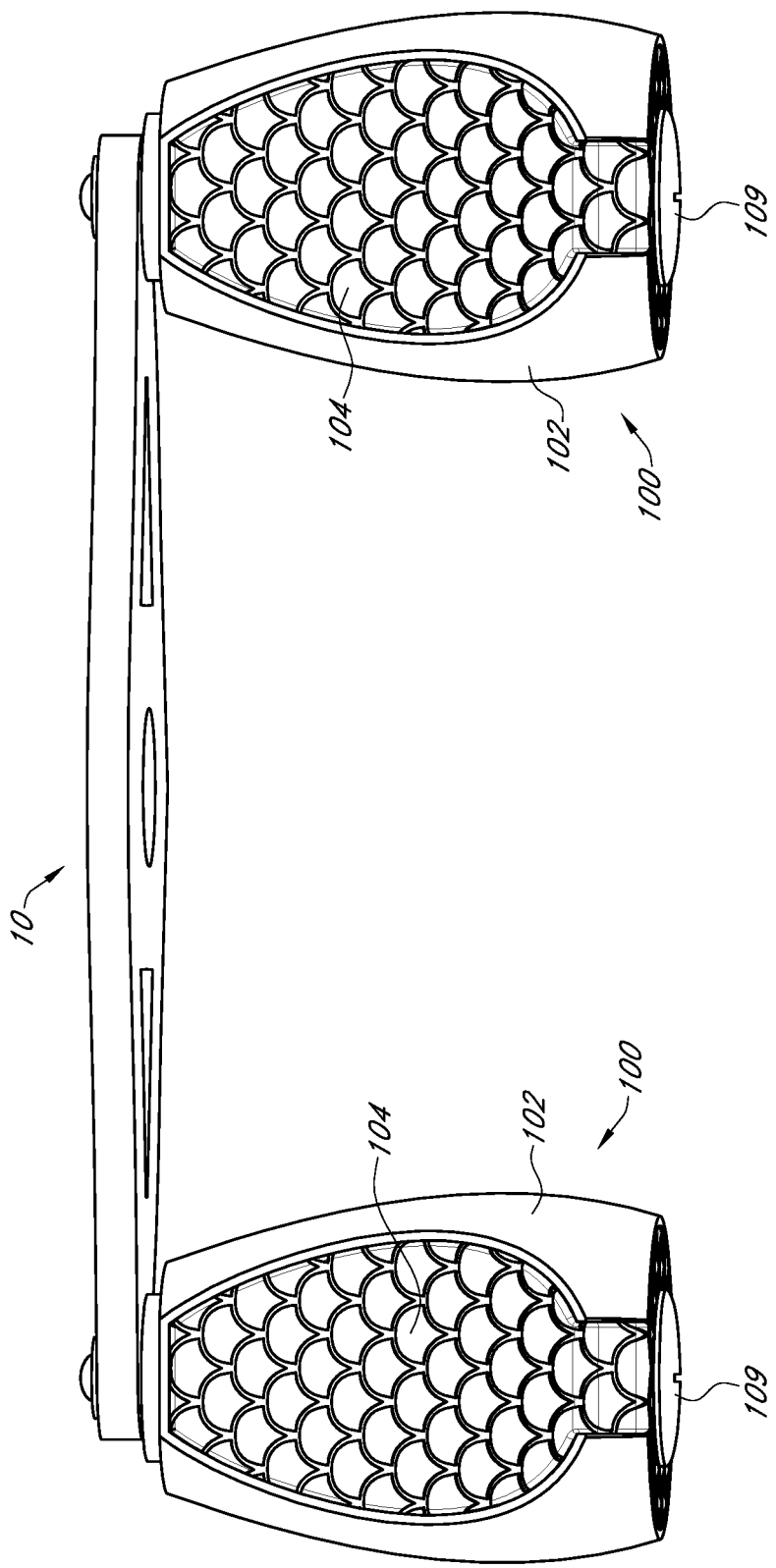
FIG. 3A is a side view of an embodiment of a handle and reel knob assembly of a reel assembly.
Figure 3B:
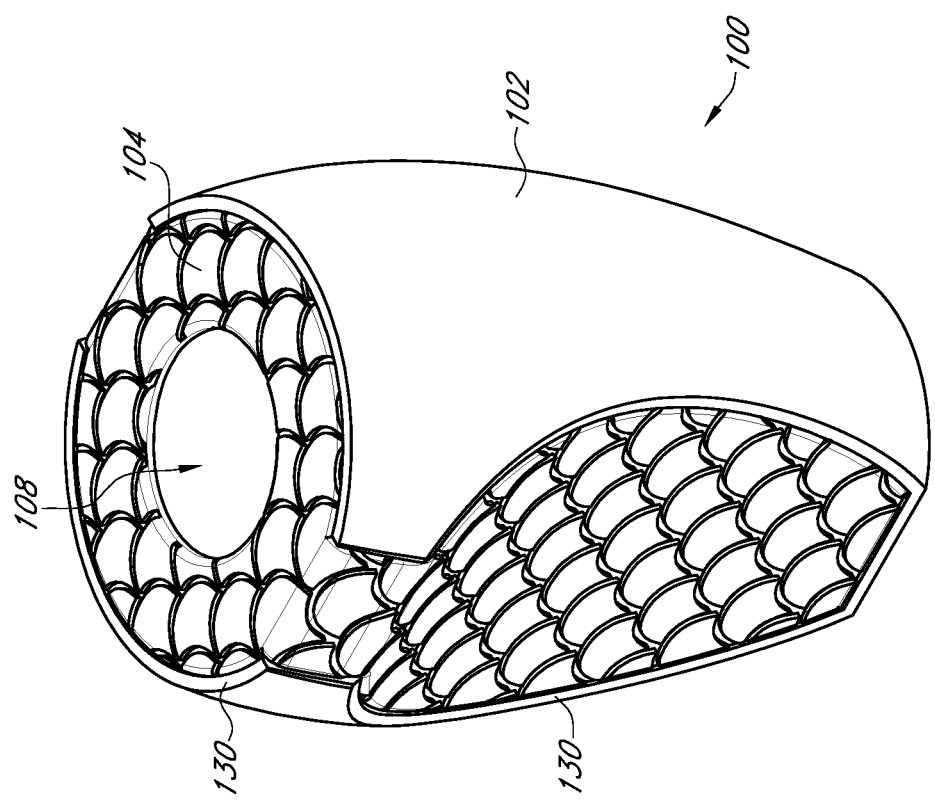
FIG. 3B is a perspective view of an embodiment of a reel knob assembly.

FIG. 2 depicts a close-up view of an embodiment of the reel 7 as disclosed herein. As mentioned above, the reel 7 can be secured to the main rod component 3 by the reel seat 5. The reel 7 can include a handle 10. Rotation of the handle 10 can cause the reel to engage a fishing line and/or retrieve the fishing line. The handle 10 can include one or more reel knobs 100. The reel knobs 100 can allow a fisher to more easily grasp, control, and/or stabilize the reel 7. For example, when assembled with the handle 10, the reel knob 100 can provide a comfortable and sufficient gripping surface to allow a fisher to control and/or limit rotation of the handle 10 about an axis of rotation.

There are a variety of types of fishing reels which can be chosen based on performance requirements and angler preference. Common types of reels include baitcast, spincast, spinning, trolling, and fly reels, for example. The embodiment depicted in FIG. 2 includes a baitcast reel, however, the fishing poles and the reels described herein may be configured to receive any embodiment of a reel knob 100 described herein.

Example Reel Knob

FIGS. 3A-6 depict an embodiment of a reel knob 100. The reel knob 100 includes a base 102 and a gripping member 104 that provides improved performance characteristics. The base 102 can include a fastener hole 108 and a recessed area 106.

The base 102 can include a bottom wall 110, a top wall 112, and at least one side wall 114. The bottom wall 110 can be configured to face inwardly. In some embodiments, bottom wall 110 can contact the reel handle 10 when assembled. The top wall 112 can be configured to face outwardly away from the reel handle 10 when assembled. For example, the top wall 112 can be exposed. Thus, the bottom wall 110 can be positioned opposite the top wall 112.

The base 102 can define an underlisting such that at least a portion of the base 102 can receive the gripping member 104. For example, the recessed area 106 can be formed in the base 102. In some embodiments, the recessed area 106 forms a depression in the base 102. The recessed area 106 can receive the gripping member 104.

In some embodiments, the underlisting comprises rubber and/or EVA to reduce the weight and lower the density of the reel knob 100 and/or to provide a cushioning material that is less inclined to absorb and hold water or other fluids. This is particularly useful in fishing pole applications, for example when the pole is dropped into the water, as the lightweight/low density reel knob according to embodiments described herein can float even when wet. In some embodiments, the base 102 is fabricated by injection molding, extrusion, and/or machining, among other manufacturing processes.

In some embodiments, the fastener hole 108 can extend along a longitudinal axis of the base 102. The fastener hole 108 can receive a fastener 109, such as a screw and/or bolt, among other mechanical fasteners. The fastener hole 108 can align with a corresponding hole of the handle 10 to receive the fastener 109. The fastener 109 can removably couple the reel knob 100 to the reel handle 10. In some configurations, the reel knob 100 is fixed to the reel handle 10.

In some embodiments, the recessed area 106 can be formed in at least one surface of the base 102. For example, the recessed area 106 can be formed along at least a portion of the side wall 114 of the base 102 and/or at least a portion of the top wall 112 of the base 102. As shown in at least FIGS. 3A-3B, the recessed area 106 can extend across at least a portion of the side wall 114 and at least a portion of the top wall 112. For example, the recessed area 106 can extend across at least a portion of opposite sides of the side wall 114 and at least a portion of the top wall 112. The recessed area 106 can be positioned on the side wall 114 spaced away from an edge formed between the bottom wall 110 and a lower end of the side wall 114. The recessed area 106 can be positioned on the side wall 114 adjacent the edge formed between the bottom wall 110 and the side wall 114. The recessed area 106 can include a top recessed portion 106A, and at least one side recessed portion 106B. As discussed below, the recessed area 106 can include at least one intermediate recessed portion 106C that connects the side recessed portion 106B to the top recessed portion 106A. The side recessed portion 106B can be formed in the side wall 114. In some embodiments, the top recessed portion 106A can be formed in the top wall 112. In some embodiments, the intermediate recessed portion 106C can be formed in the side wall 114.

In some embodiments, the recessed area 106 is generally curved along the side recessed portion 106B. For example, the recessed area 106 can form a concave surface along at least a portion of the side recessed portion 106B to allow the angler to more easily grip the reel knob 100. As shown in at least FIGS. 3B, 4A, and 5C-5D, a portion of the recessed area 106 positioned near the top wall 112 of the base 102 can extend outwardly away from the top wall 112 to a distance greater than a portion of the recessed area 106 positioned closer to the bottom wall 110 of the base 102.

In some embodiments, the side recessed portion 106B has a lower end 115 and an upper end 116. In some embodiments, the lower end 115 has a width 115A that is wider than a width 116A of the upper end 116. In some embodiments, the width 115A of the lower end is narrower than or equal to the width 116A of the upper end 116. In some embodiments, the width 115A of the lower end 115 and/or the width 116A of the upper end 116 can be approximately 8.18 mm, 8.20 mm, 8.22 mm, and/or 8.24 mm or greater.

In some embodiments, the side wall 114 has a maximum width 114A. The maximum width 114A of the side wall can be approximately 26.95 mm. In some embodiments, the maximum width 114A of the side wall 114 can be approximately 26.8 mm to 26.9 mm, 26.9 mm to 27.0 mm, and/or 27.0 mm to 27.1 mm or greater. The maximum width 114A of the side wall 114 can be greater than a maximum width 112A of the top wall 112. For example, the maximum width 112A of the top wall 112 can be approximately 23.59 mm. In some embodiments, the maximum width 112A of the top wall 112 is greater than or less than 23.95 mm. In some embodiments, the maximum width 112A of the top wall 112 is greater than a maximum width 110A of the bottom wall 110.

In some embodiments, the maximum width 114A of the side wall 114 is wider than the width of the lower and/or upper ends 115A, 116A. In some embodiments, a distance 120 between a region 118 of the side wall 114 having the maximum width 114A and the bottom wall 110 is greater than a distance 122 between the region 118 and the top wall 112. In some embodiments, the distance 120 is approximately twice the distance 122. In some embodiments, the distance 120 is approximately three times the distance 122. In some embodiments a total length of the base 102 can be approximately 36.0 mm.

As discussed above, in some embodiments the recessed area 106 can include the intermediate recessed portion 106C. The intermediate recessed portion 106C can smoothly transition between the side recessed portions 106B and the top recessed portion 106A. In some embodiments, the intermediate recessed portion 106C forms an edge between the side recessed portions 106B and the top recessed portion 106A. In some embodiments, a first region of the intermediate recessed portion 106C forms an edge with the top recessed portion 106A and a second region of the intermediate recessed portion 106C forms an edge with the side recessed portions 106B. In some embodiments, a surface of the intermediate recessed portion 106C is rounded. For example, the surface of the intermediate recessed portion 106C can be convex and/or rounded outwardly. In some embodiments, the surface of the intermediate recessed portion 106C is concave and/or flat. In some embodiments, the intermediate recessed portion 106C is tapered from the side recessed portions 106B towards the top recessed portion 106A. The intermediate recessed portion 106C can have a width that is less than or equal to the width 115A of the lower end 115. In some embodiments, the width of the intermediate recessed portion 106C is less than a maximum width of the side recessed portions 106B of the base 102.

Figure 4A:
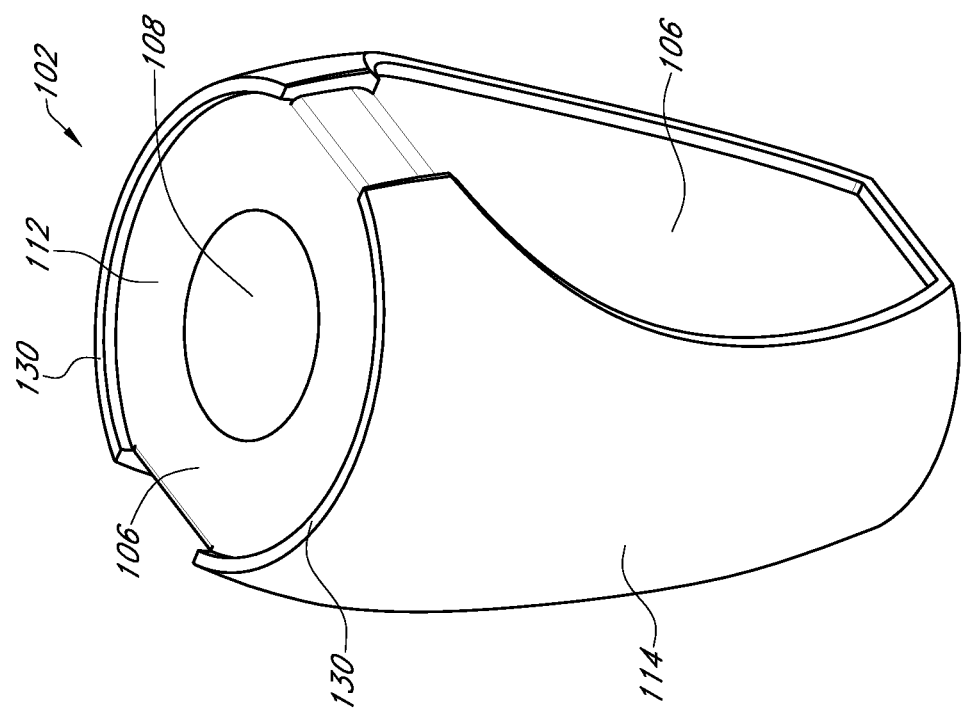
FIG. 4A is a side and top perspective view of a base of a reel knob assembly.
Figure 4B:
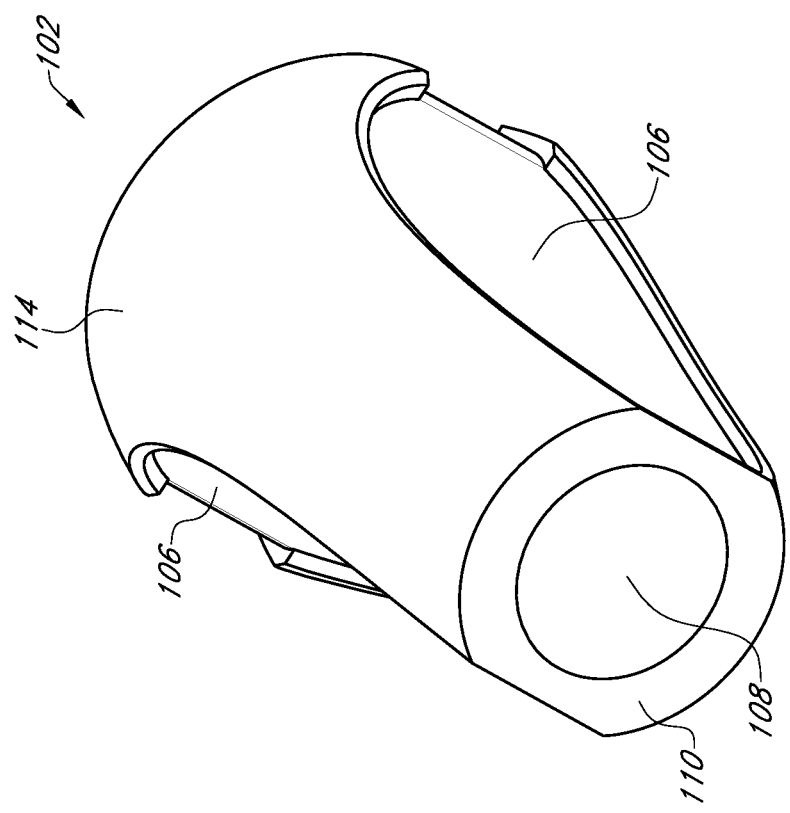
FIG. 4B is a bottom and side perspective view of the base of FIG. 4B.
Figure 5A:
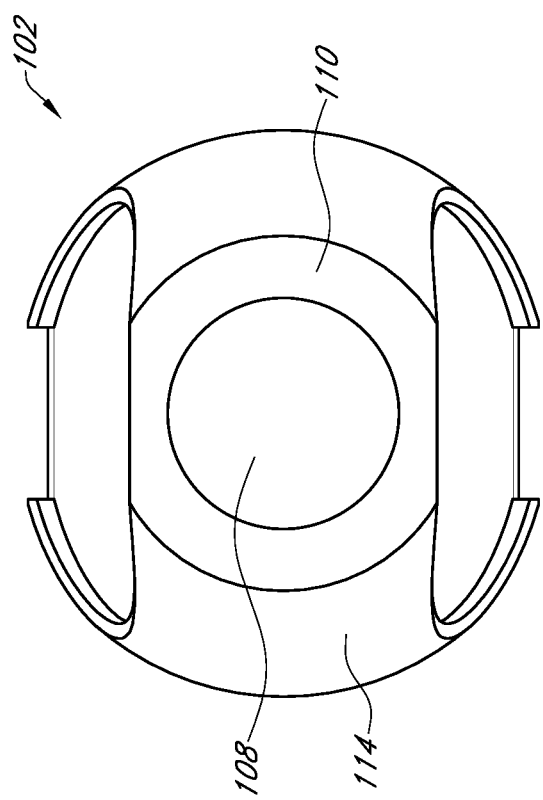
FIG. 5A is a bottom view of a base of a reel knob assembly.
Figure 5B:
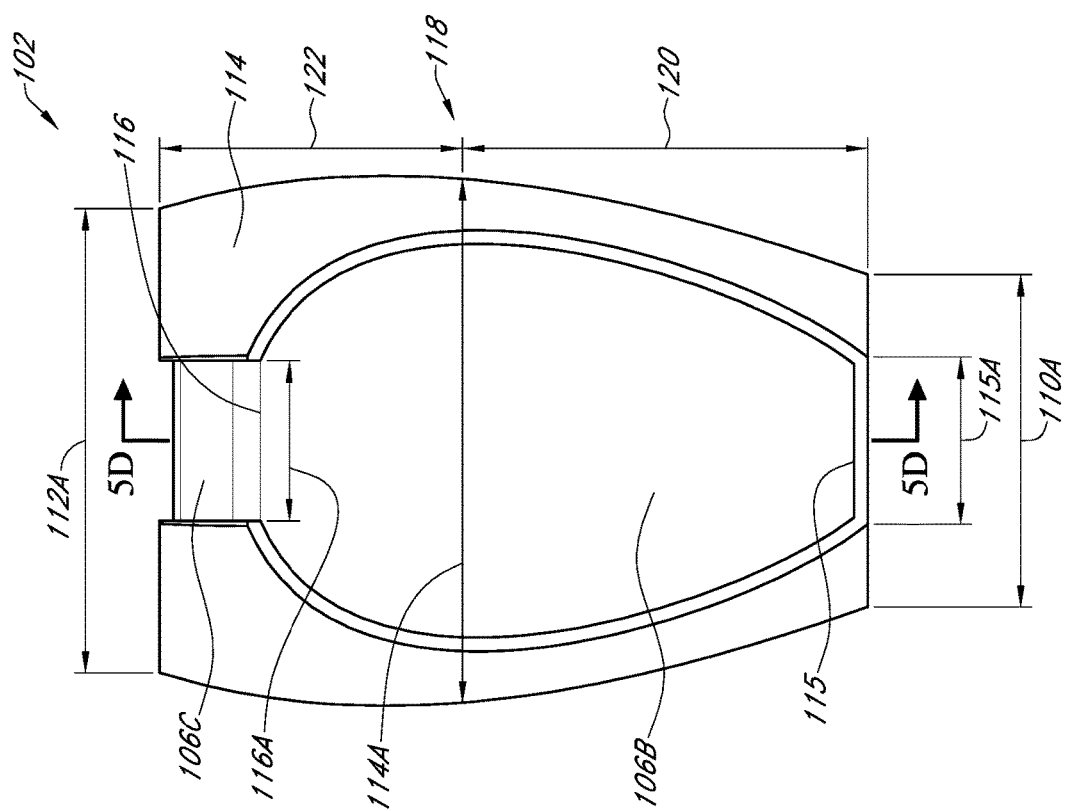
FIG. 5B is a side view of the base of FIG. 5A.
Figure 5C:
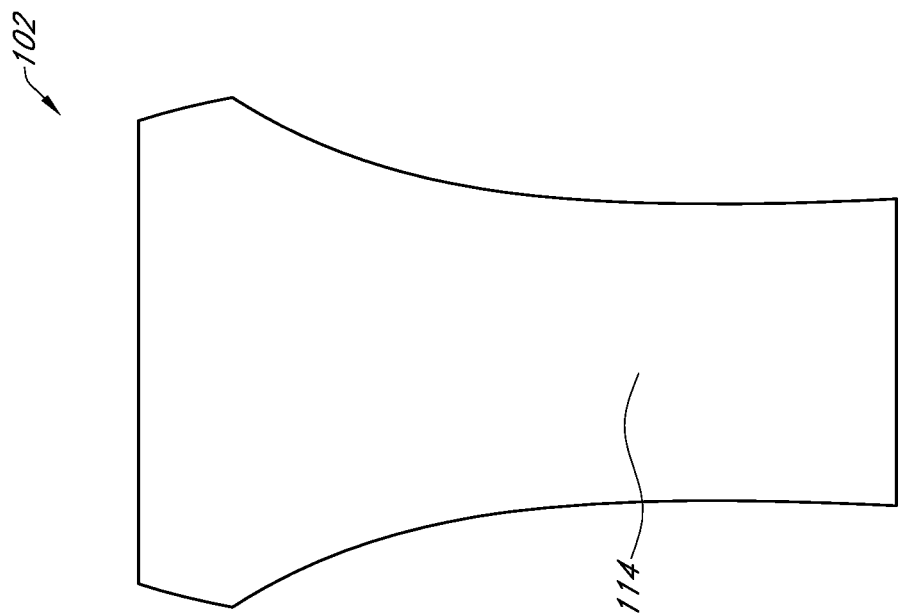
FIG. 5C is a side view of the base of FIG. 5A.
Figure 5D:
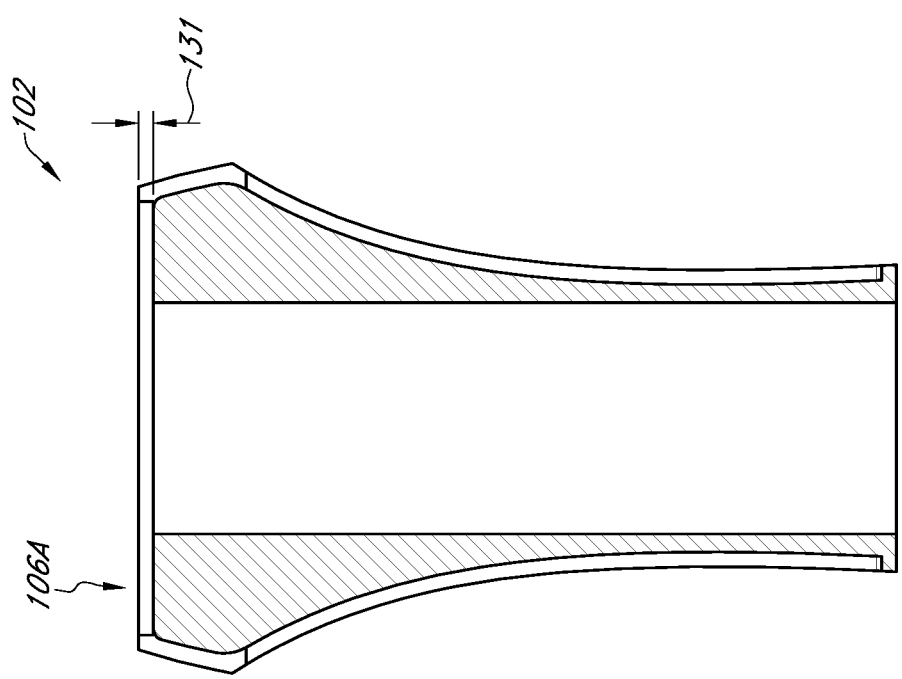
FIG. 5D is a cross-sectional view of the base of FIG. 5A.

As shown in at least FIGS. 4A and 5D, the recessed area 106 can surround an opening of the fastener hole 108 at the top wall 112 of the base 102. In some embodiments, a surface of the top recessed portion 106A is approximately flat along the top wall 112 of the base 102. In some embodiments, top recessed portion 106A is curved and/or concave along the top wall 112 of the base 102.

In some embodiments, the recessed area 106 can include a lip 130. The lip 130 can surround a perimeter of the recessed area 106. In some embodiments, the lip 130 spaces apart an outer surface of the base 102 from the gripping member 104 when the gripping member 104 is positioned within the recessed area 106. The lip 130 can protect the exposed upper end of the base 102. In some embodiments, the lip 130 has a width that is approximately 0.71 mm wide. In some embodiments, the width of the lip 130 is greater than or less than 0.71 mm wide. In some embodiments, the width of the lip 130 is approximately equal to the depth of the recessed area 106. In some embodiments, the width of the lip 130 is greater than the depth 131 of the recessed area 106.

As shown in FIG. 5A, in some embodiments, the bottom wall 110 of the base 102 may not include a lip 130. For example, the bottom wall 110 can have a surface that is approximately flat. In some embodiments, the surface of the bottom wall 110 is curved and/or concave along the bottom wall 110. The surface of the bottom wall 110 can surround an opening of the fastener hole 108. In some embodiments, the side walls 114 extend upwardly from an outer edge of the bottom wall 110. In some configurations, the bottom wall 110 may be positioned adjacent to and/or flush against the reel handle when assembled (see FIG. 3A, for example).

Figure 6:
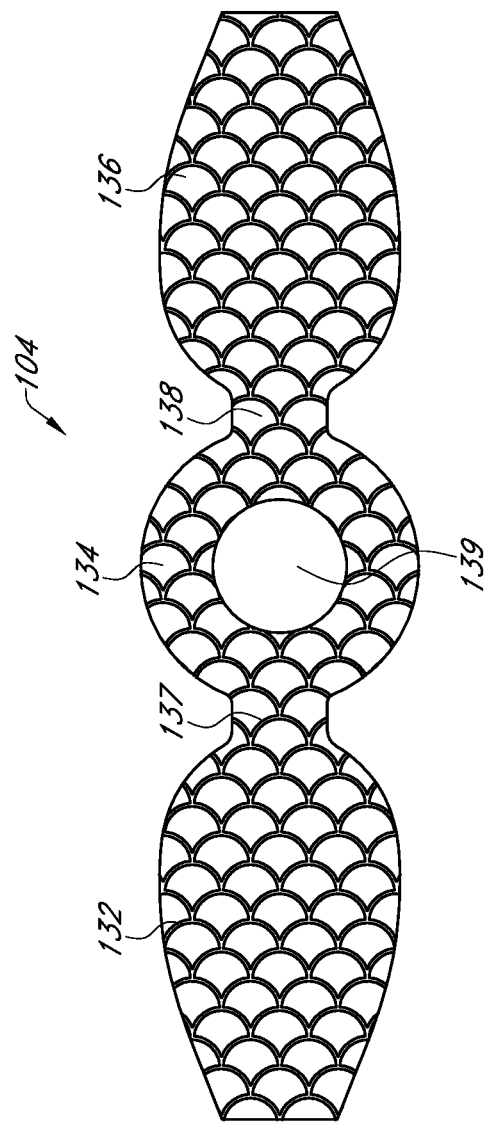
FIG. 6 is a top view of an embodiment of a gripping member of a reel knob assembly.

FIG. 6 illustrates an embodiment of the gripping member 104. The gripping member 104 can include a thin flexible panel defining a fabric layer. In some embodiments, a thin fabric layer can be dipped into liquid polyurethane. The polyurethane can be generally removed from one side of the fabric and can be coagulated to form a layer of coagulated polyurethane on the opposite side of the fabric and partially extending through the fabric. The layer of coagulated polyurethane can be treated to form a pattern that can be aesthetically pleasing and/or can enhance grip. Such patterns can be formed, for example, by heat embossing. Examples of suitable gripping member materials are described in greater detail below. In some embodiments, the gripping member 104 can be shaped and/or sized to correspond to the recessed area 106 when applied thereto. The gripping member 104 may be folded and/or wrapped around the recessed area 106. As described below, the gripping member 104 can be bonded, adhered, or otherwise attached to at least a portion of the base 102.

As shown in the illustrated embodiment, the gripping member 104 can include a first portion 132, a central portion 134, and a second portion 136. The first portion 132 can be connected to the central portion 134 by a first connecting portion 137 and the second portion 136 can be connected to the central portion 134 by a second connecting portion 138. The first portion 132, the first connecting portion 137, the central portion 134, the second connecting portion 138, and the second portion 136 are shaped and sized to correspond to the shape of the recessed area 106 of the base 102 of the reel knob. As discussed in more detail below, the central portion 134 of the gripping member 104 is configured to fit within the top recessed area 106A. For example, the central portion 134 of the gripping member 104 includes an aperture. The aperture is configured to extend around the fastener hole 108 of the base 102. In some embodiments, the first and second connecting portions are configured to fit within the corresponding intermediate recessed portions 106C. In some embodiments, the first and second portions 132, 136 of the gripping member 104 are configured to fit within the corresponding side recessed portions 106B. In some embodiments, side walls of the gripping member 104 are positioned adjacent to and/or contact side walls of the recessed area 106 when assembled. In some embodiments, the side walls of the gripping member 104 can be adhered directly to the side walls of the recessed area 106. In some embodiments, the side walls of the gripping member 104 are positioned inwardly from the side walls of the recessed area 106 when assembled. For example, the side walls of the gripping member 104 may not contact or only partially contact the side walls of the recessed area 106 when assembled.

As discussed above, the gripping member 104 may be cut into a suitable shape corresponding to the recessed area 106 of a compatible reel knob 100. In some embodiments, a thickness of the gripping member 104 corresponds generally to a depth of the recessed area 106 to facilitate the creation of a smooth transition from the gripping member 104 to other portions of the reel knob 100. In some embodiments, the thickness of the gripping member 104 may vary to provide various performance benefits to different portions of the reel knob 100. In such embodiments, the edges of the reel knob 100 may correspond in thickness to the depth of the recessed area 106 to facilitate the creation of a smooth transition from the outer surface of the gripping member 104 to the reel knob 100. In some embodiments, the gripping member 104 is recessed within the recessed area 106. For example, the surface of the gripping member 104 may be positioned inwardly from the lip 130 of the recessed area 106. Such configurations can desirably protect the gripping member 104 and/or provide enhanced gripping ability. As described in more detail below, the gripping member 104 can include various materials that provide improved performance.

Example Method of Assembly

Figure 7:
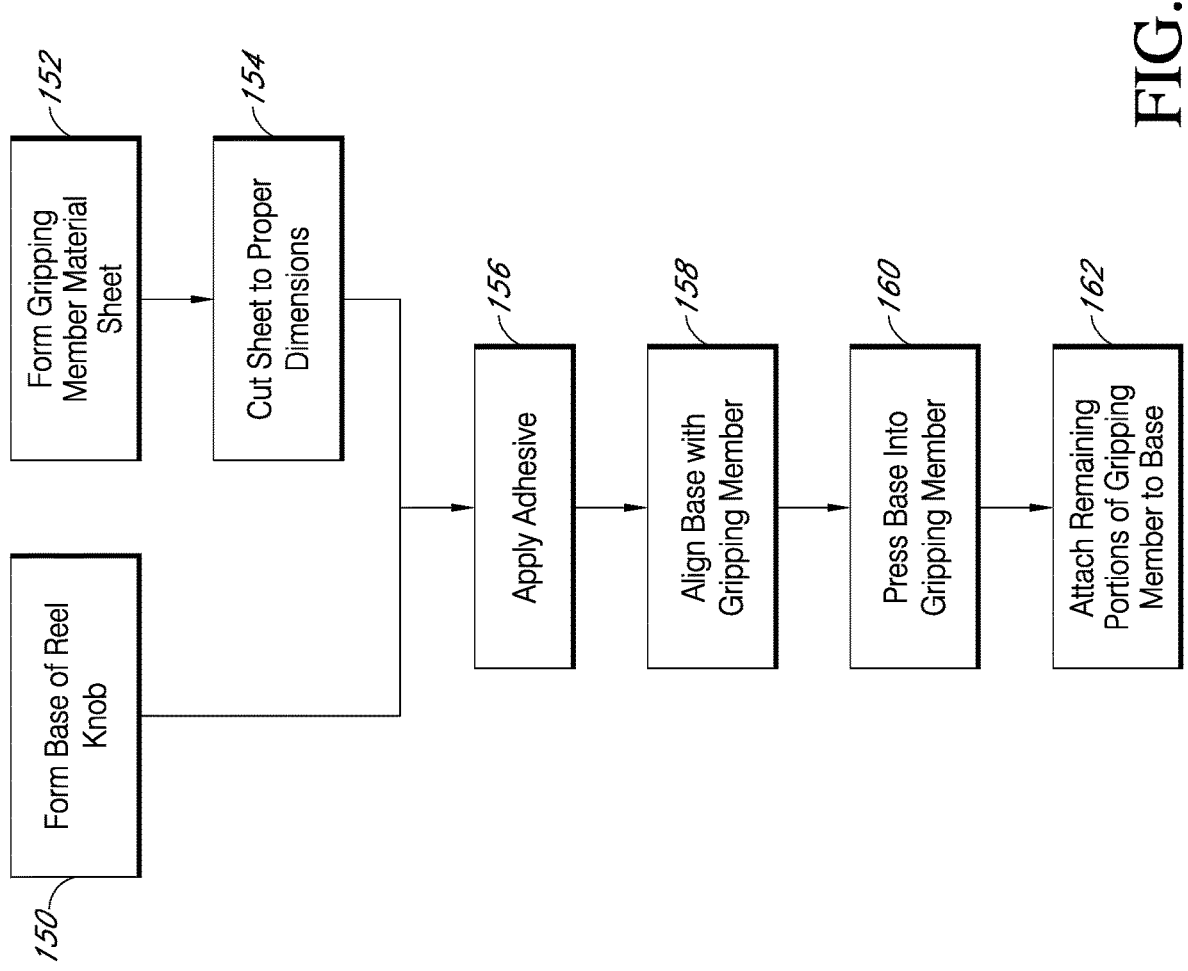
FIG. 7 is an example method of assembling the reel knob assembly.

FIG. 7 illustrates an example method of assembling the reel knob 100. At block 150, the base 102 of the reel knob 100 can be formed through various manufacturing processes. For example, the base 102 can be fabricated by injection molding, 3D printing, extrusion, and/or machining, among other manufacturing processes.

At block 152, the material of the gripping member 104 material can be formed as a fabric sheet according to methods and processes described herein. At block 154, the fabric sheet can be shaped and sized to the proper dimensions. For example, the fabric sheet can be cut into the proper shape by various processes, such as punch cutting and/or laser cutting, among other methods.

At block 156, adhesive can be applied to at least a portion of the base 102 of the reel knob 100 and/or to an inner surface of the gripping member 104. In some embodiments, an adhesive is sprayed, painted, or otherwise applied to the recessed area 106 of the reel knob 100, the inner surface of the gripping member 104 or both the recessed area 106 and the inner surface of the gripping member 104. As the gripping member 104 is folded, wrapped or otherwise applied to the recessed area 106, the adhesive may attach the gripping member 104 to the reel knob 100 in a secure manner. In some embodiments, the gripping member 104 can include an adhesive layer such that additional adhesive need not be separately applied.

Figure 8:
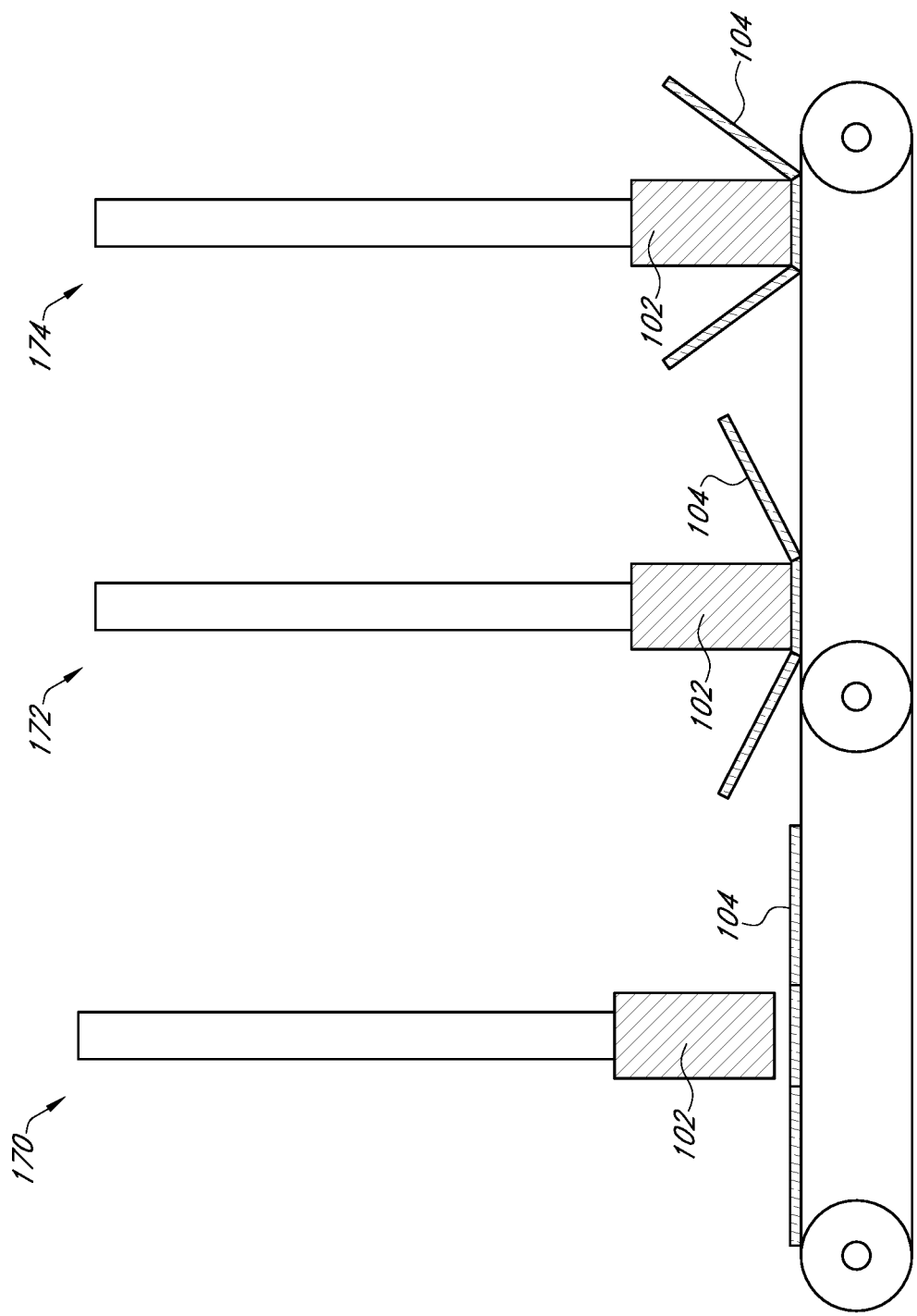
FIG. 8 is a depiction of an example method of assembling the reel knob assembly.
Figure 9:
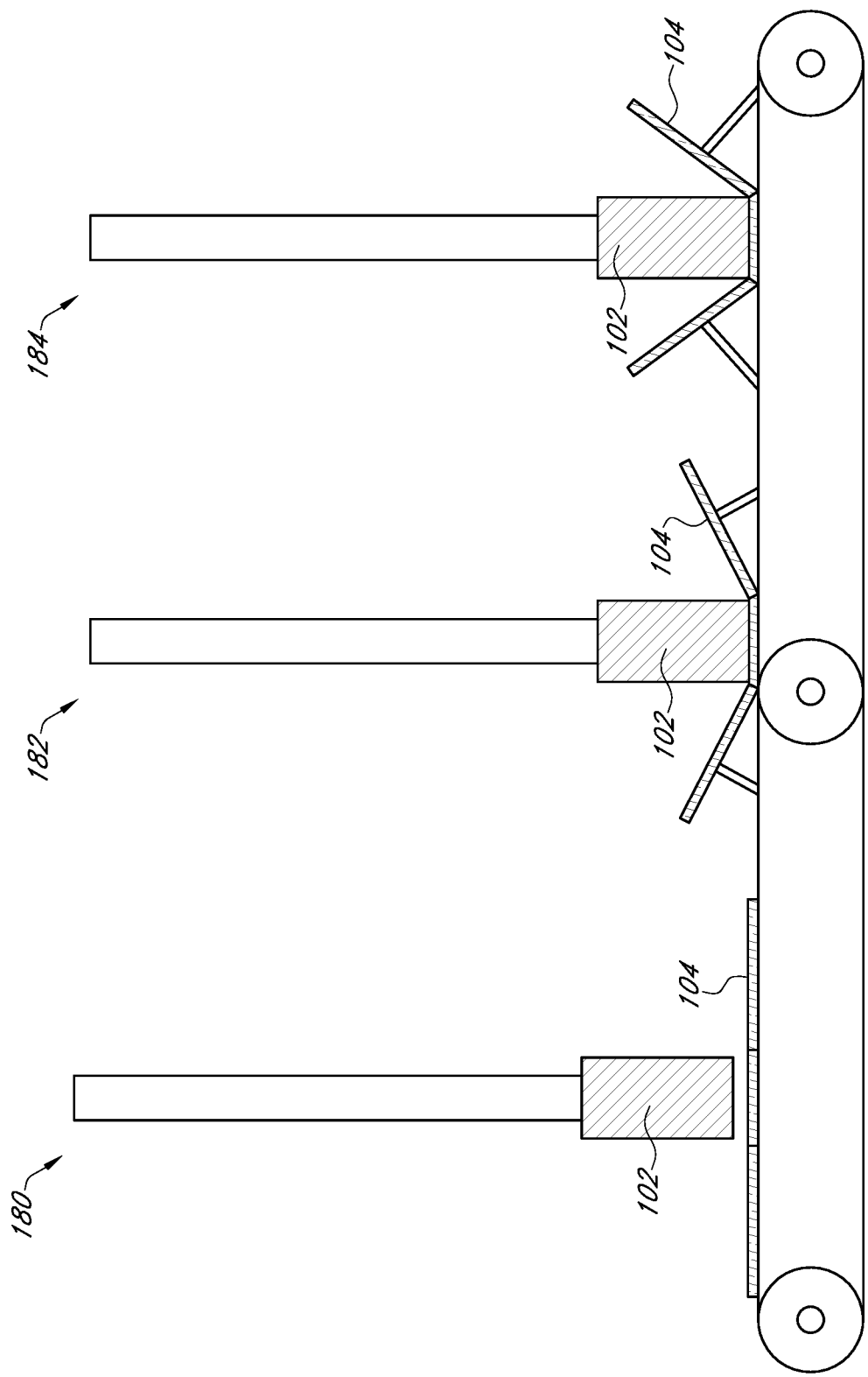
FIG. 9 is a depiction of an example method of assembling the reel knob assembly.

Once adhesive is applied to the base 102 and/or the gripping member 104, the gripping member 104 may be applied to the base 102. For example, at block 158, a center of the fastener opening 108 of the top wall 112 can be aligned with a center of the aperture 134 of the gripping member 104. FIGS. 8 and 9 illustrate example methods of attaching the gripping member 104 to the base 102. For example, as shown in FIGS. 8 and 9, the gripping member 104 can be positioned flat and/or approximately perpendicular to the base 102. The base 102 can be lowered at steps 170, 180 towards the gripping member 104. The base 102 can be aligned with the gripping member 104 before, during and/or after the base 102 is lowered towards the gripping member 104.

As shown in FIG. 7, at block 160, the base 102 can be pressed downwardly into the gripping member 104. For example, the surface of the top recessed area 106A can contact the inner surface of the central portion of the gripping member 104. At block 162, the remaining portions of the gripping member 104 can be attached (e.g., adhered) to the base 102. Configurations of such processes can increase the speed and efficiency of assembling the reel knob 100 and/or adhering the gripping member 104 to the base 102.

In some embodiments as shown in FIG. 8, the base 102 can contact the gripping member 104 at step 170. As shown in the transition between steps 172 and 174, as the base 102 is lowered into the gripping member 104 and pushed downwardly, the first and second connecting portions 137, 138 and the first and second portions 132, 136 of the gripping member 104 fold upwardly towards the intermediate recessed portions 106C and the corresponding side portions 106B until each portion of the gripping member 104 is positioned within the recessed area 106 and/or is adhered to the base 102.

In some embodiments, such as the illustrated embodiment in FIG. 9, the base 102 can contact the gripping member 104 at step 180. Before, after, and/or at the same time the base 102 contacts the gripping member 104, a ramp, guide and/or other mechanism can push the first and second connecting portions 137, 138 and the first and second portions 132, 136 of the gripping member 104 towards the corresponding regions of the base 102. At step 182, the ramp pushes at least some portions of the gripping member 104 upwardly towards the base 102 until each portion of the gripping member 104 is positioned within the recessed area 106 and/or is adhered to the base 102.

Gripping Member

There are many fishing poles used in the sport of fishing. The most common grips have utilized ethylene vinyl acetate or cork to provide a gripping surface. New improvements to grips have introduced previously unavailable opportunities to enhance various visual and performance aspects of fishing pole grips. However, reel knobs of fishing pole reel handles have not been modified to take advantage of the new materials.

In one embodiment disclosed herein, a reel knob 100 is provided with an improved gripping surface for providing better comfort and control while maintaining transmittal of vibrations through the rod and methods for producing such reel knobs. For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein. In addition, embodiments of these reel knobs may be used as a reel component for use with a fishing pole described herein.

As described above, the gripping member 104 can be attached to the base 102. The gripping member 104 may include a variety of materials to provide the performance characteristics desired by an angler. For example, in some embodiments, the gripping member 104 may provide a grip that is light in weight and reduces or eliminates the absorption of water. Some embodiments provide a feeling of tackiness while also minimizing the weight/density of the grip. In some embodiments, the reel knob 100 as disclosed herein has a grip portion that provides transmission of vibrations from the fishing rod or reel, aesthetic appeal, and a comfortable surface. Embodiments of the present invention provide a lightweight/low density gripping surface with sufficient torsion resistance on at least portions of the reel knob 100.

In some embodiments, a finished grip portion of a reel knob may include a resilient material that is resilient relative to the structural portion of the reel knob. In some embodiments, the finished reel knob 100, as described herein, may include a combined polyurethane/thin fabric layer adhered to the recessed area, which defines an underlisting. As described above, the underlisting may include ethylene-vinyl-acetate (EVA). In some embodiments, this may provide a light-weight water resistant grip on the surface of a reel knob, while still providing the sensitive vibration feel and structural benefits to be able to float on water even when wet.

In some embodiments, the gripping member 104 can include multiple layers. For example, in some embodiments, the gripping member 104 can include a combination polyurethane and thin fabric layer. The fabric layer can be impregnated with polyurethane, as described below. In some embodiments, the polyurethane further includes a woven fabric mesh layer disposed outside the impregnated fabric layer. In some embodiments, the gripping material may instead be generated with injection molding, 3D printing, or another appropriate process.

As discuss above, an outer surface of the gripping member 104 may comprise a polyurethane material. In some embodiments, the polyurethane material may be manufactured as a thin non-woven fabric layer that is saturated with polyurethane, by, for example, dipping the thin fabric layer into a polyurethane bath. For example, the non-woven fabric layer can include an outer surface and an inner surface. The fabric layer may be fabricated of suitable materials such as nylon, cotton, polyester, felt and/or the like.

In some embodiments, after the fabric layer is directed out of the polyurethane bath, at least a portion of the polyurethane is removed from the bottom of the fabric. In some embodiments, a majority of the polyurethane is removed. In addition, the top surface of the polyurethane may be smoothed. Thus, the bottom surface can be rougher than the top surface. The bottom surface can facilitate bonding, adhering, or otherwise joining the panel to the recess.

The polyurethane is preferably coagulated to form one or more closed cells or pores. The coagulation process can generally allow the polyurethane to expand and increase in thickness. In addition, pores preferably form within the polyurethane and can enhance features of the gripping member 104 including tackiness of the sheet material.

In some embodiments, the fabric layer may be compressed to reduce its thickness prior to the application of polyurethane thereto. In some embodiments, the compression also enhances the rigidity of the fabric layer. In some embodiments the compression also spreads the non-woven fibers to enhance the penetration of the polyurethane into the thin fabric layer. Increasing the amount of polyurethane penetration and saturation into the thin fabric layer reduces the amount of space available for water and other fluids to soak into and become trapped within the gripping member. This is particularly useful in fishing pole applications.

In some embodiments, the thin non-woven fabric layer is between approximately 0.1 and 0.5 millimeters. In some embodiments, the thin non-woven fabric layer is between approximately 0.3 and 0.4 millimeters thick. In some embodiments, the thin non-woven fabric layer is between approximately 0.3 and 0.35 millimeters thick. In some embodiments, the thin fabric layer is approximately 0.35 millimeters thick. In some embodiments, the polyurethane coating the thin fabric layer is between approximately 0.1 and 0.4 millimeters thick measured from the outer surface of the fabric layer. In some embodiments, the polyurethane coating the thin fabric layer is between approximately 0.15 and 0.25 millimeters thick. The polyurethane coating the thin fabric layer can be approximately 0.2 millimeters thick.

In some embodiments, not shown, additional liquid polyurethane can be added to the top surface of the uncoagulated polyurethane that coats the thin fabric sheet after the sheet is directed out of a polyurethane bath and before the polyurethane is coagulated. The second polyurethane can include one or more different characteristics from the first polyurethane to provide contrast on the gripping member and they may be coagulated together to form a contiguous polyurethane layer with different properties. For example, the second polyurethane can include a different color, durometer or level of tackiness. In some embodiments, a coating layer of polyurethane or other polymer may be included on the outer surface of the gripping member 104 for enhanced water resistance.

Figure 12:
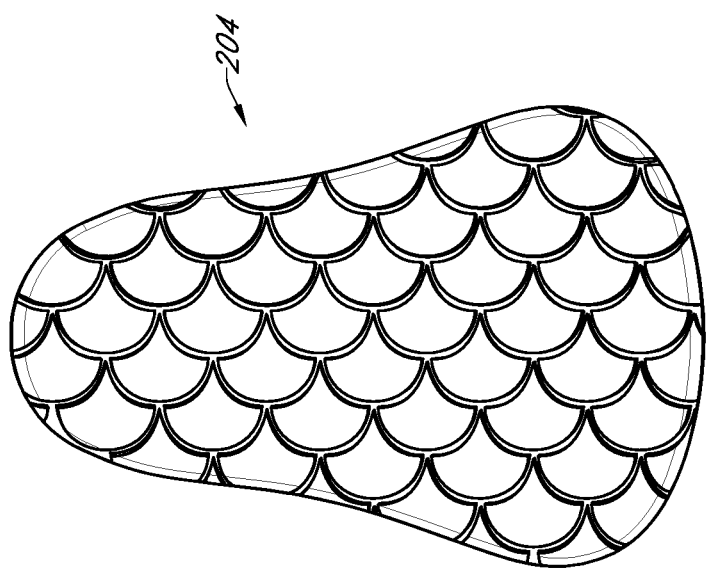
FIG. 12 is a side view of an embodiment of a gripping member of a reel knob assembly.

In some embodiments, a pattern may be imprinted on the surface of the gripping member 104 to provide enhanced friction to provide additional gripping ability to the reel knob 100. For example, a mold can be used to form a friction enhancing pattern on the top surface of the gripping member 104. As shown in FIGS. 6 and 12, the pattern can include various repeating shaped portions. For example, the pattern can include repeating U-shaped portions. The U-shaped portions can be positioned in a vertical (e.g., FIG. 6) and/or horizontal orientation (e.g., FIG. 12). For example, an apex of adjacent U-shaped portions can be vertically aligned and/or horizontally aligned. The repeating shaped portions can be spaced apart. For example, adjacent repeating shaped portions can be spaced apart by a recess. The recess can desirably provide enhanced friction to provide additional gripping ability to the gripping member 104. The recess can collect water and/or drain water from the gripping member to limit slipping of the reel knob 100 in use.

In some embodiments, the gripping member 104 may be constructed from different materials than described above. For example, the gripping member 104 may be polyurethane injection molded into a shape corresponding to the recessed area 106. In some embodiments, the gripping member 1018 may be formed on the recessed area 106. For example, the gripping member 104 may be formed by depositing a resilient material into the recessed area 106 to form a grip on reel knob 100. In some embodiments the gripping member 104 may be made out of other materials, such as, layered polyurethane and EVA without a felt layer, a single polyurethane layer, natural materials including leather, fabrics, cork, wood, rubber, or other natural materials or products, other natural or synthetic polymer materials, or any other resilient material that provides desirable performance or aesthetic characteristics for anglers.

In some embodiments, the gripping member 104 may be removed from the reel knob 100 and replaced with another gripping member 104. This may enable an angler to fix problems occurring from a worn or damaged grip on the reel knob 100. In some embodiments, this may also enable an angler to change the aesthetic appearance of a reel knob 100 or to change performance characteristics of the gripping member 104 to suit the angler's preferences or a particular activity's needs. For example, if an angler is outfitting a pole with a new reel for a different type of fishing, the angler may prefer to use a reel 7 having different gripping characteristics than with a previously used reel 7.

Example Reel Knob

Figure 10A:
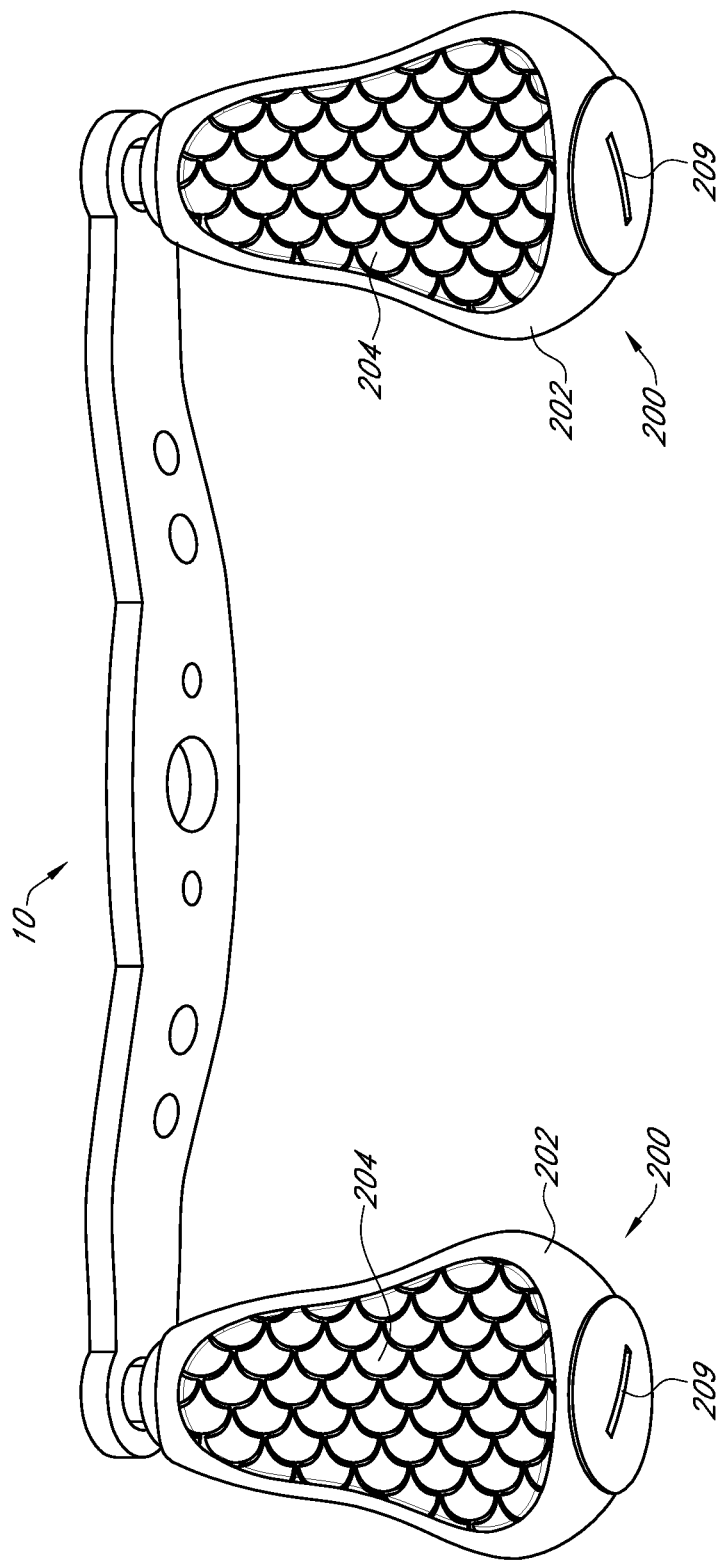
FIG. 10A is a side view of an embodiment of a handle and reel knob assembly of a reel assembly.

FIGS. 10A-12 illustrate another embodiment of a reel knob 200. The reel knob 200 is similar or identical to the reel knob 100 discussed above in many respects. For example, as shown in FIGS. 10A-10B, the reel knob 200 can include a base 202 and a gripping member 204, which can be respectively similar to the base 102 and the gripping member 104 described above in connection with the reel knob 100. The reel knob 200 can include any one, or any combination, of the features of the reel knob 100.

As shown in FIGS. 10A-12, the reel knob 200 includes a base and a gripping member 204 that provides improved performance characteristics. The base 202 can include a fastener hole 208 and at least one recessed area 206. In some embodiments, the base 202 can include at least two recessed areas 206.

The base 202 can include a bottom wall 210, a top wall 212, and a side wall 214. The bottom wall 210 can be configured to face inwardly and/or contact the reel handle 10 when assembled. The top wall 212 can be configured to face outwardly away from the reel handle 10 when assembled such that the upper end is exposed. The bottom wall 210 can be positioned opposite the top wall 212.

Figure 10B:
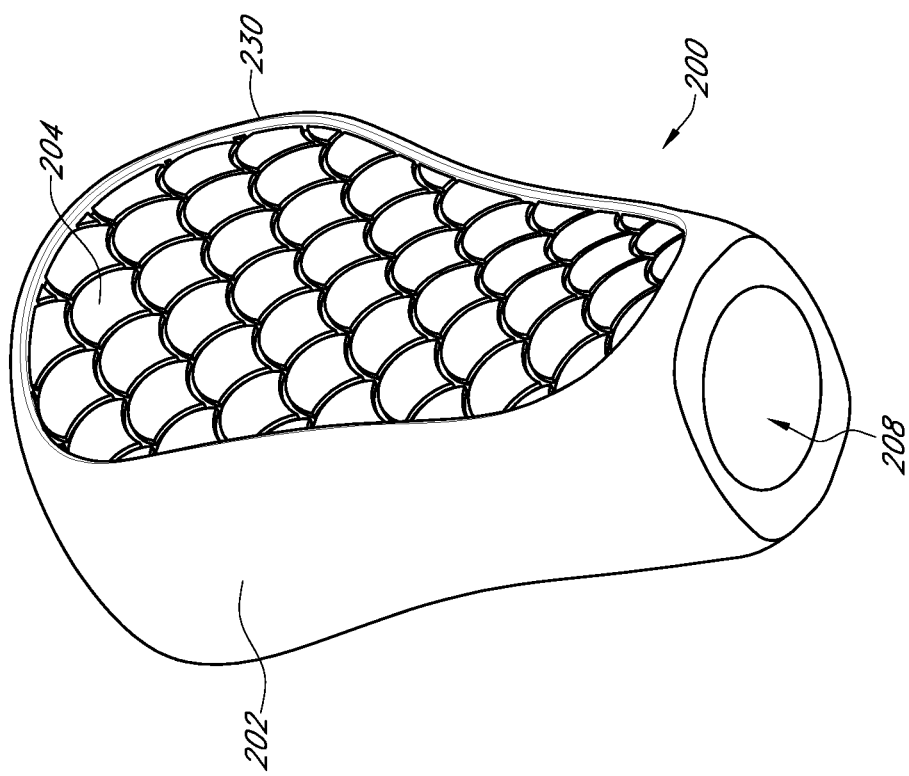
FIG. 10B is a perspective view of an embodiment of a reel knob assembly.

In some embodiments, the recessed area 206 can be formed in at least one surface of the base 202. For example, the recessed area 206 can be formed along at least a portion of the side wall 214 of the base 202. As shown in FIGS. 10A and 10B, the recessed area 206 is formed along at least two portions of the side wall 214 of the base 202. For example, the base 202 can include a first recessed area 206A and a second recessed area 206B.

Figure 11A:
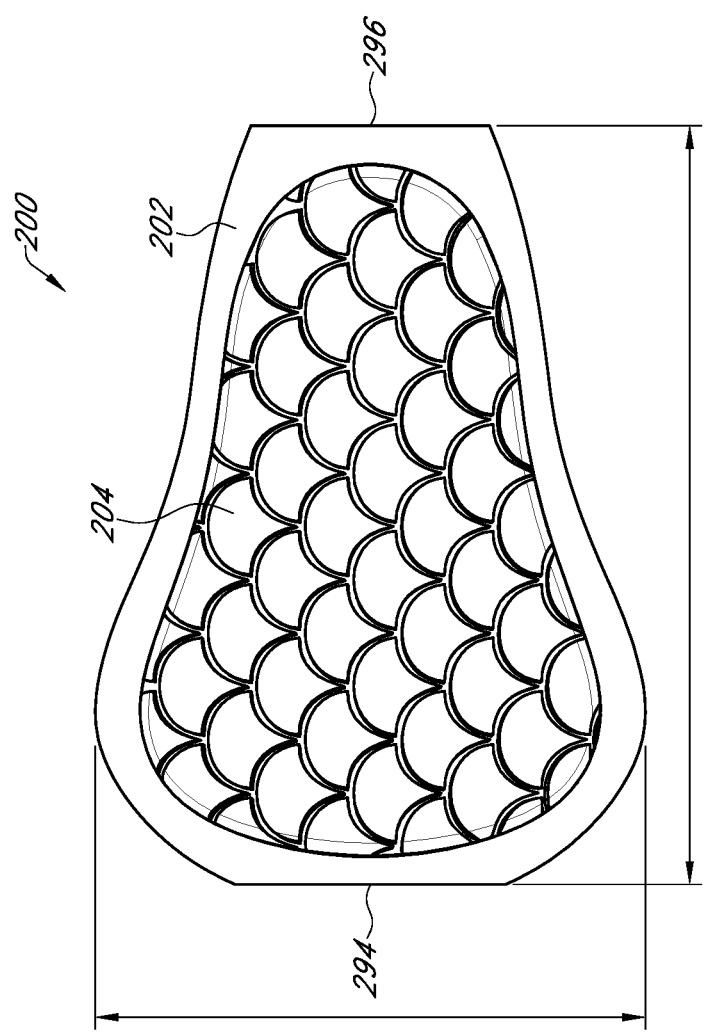
FIG. 11A is a side view of an embodiment of a reel knob assembly.
Figure 11B:
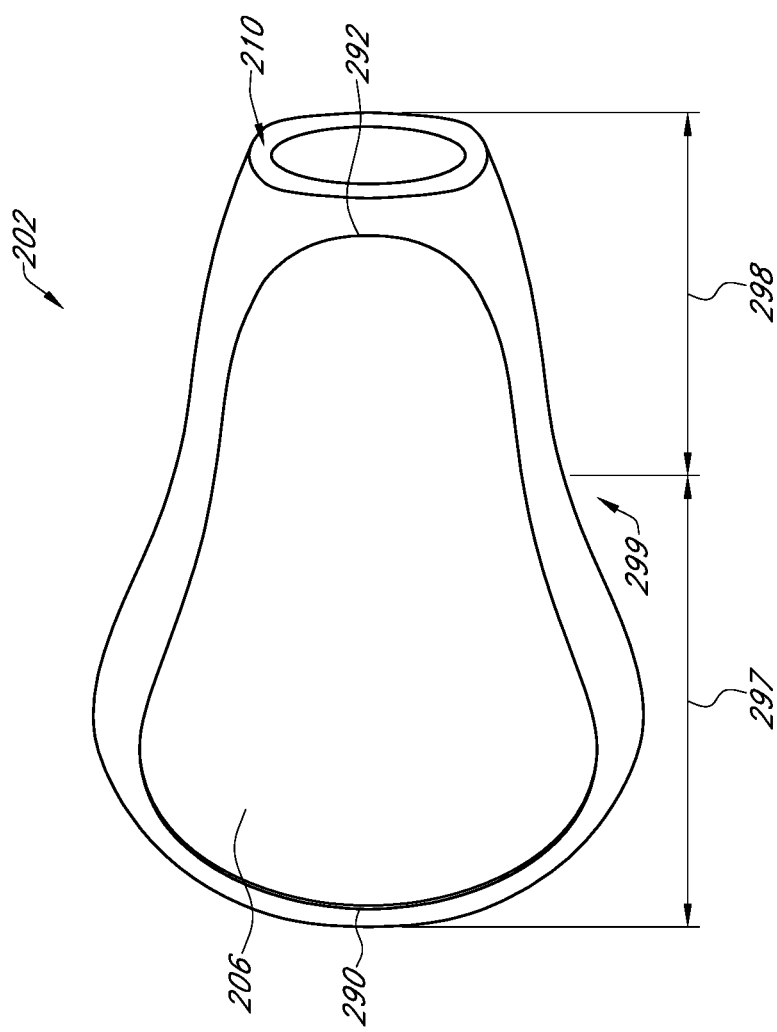
FIG. 11B is a side view of an embodiment of a base of the reel knob assembly of FIG. 11A.

In some embodiments, a surface of the recessed area 206 can be curved and/or flat. For example, the surface of the recessed area 206 can be concave. As shown in FIG. 11A, for example, an upper end 290 of the recessed area 206 can have a width that is larger than a width of a lower end 292 of the recessed area 206. Similarly, an upper end 294 of the base 202 can have a width that is larger than a width of the lower end 296 of the base 202.

Figure 11C:
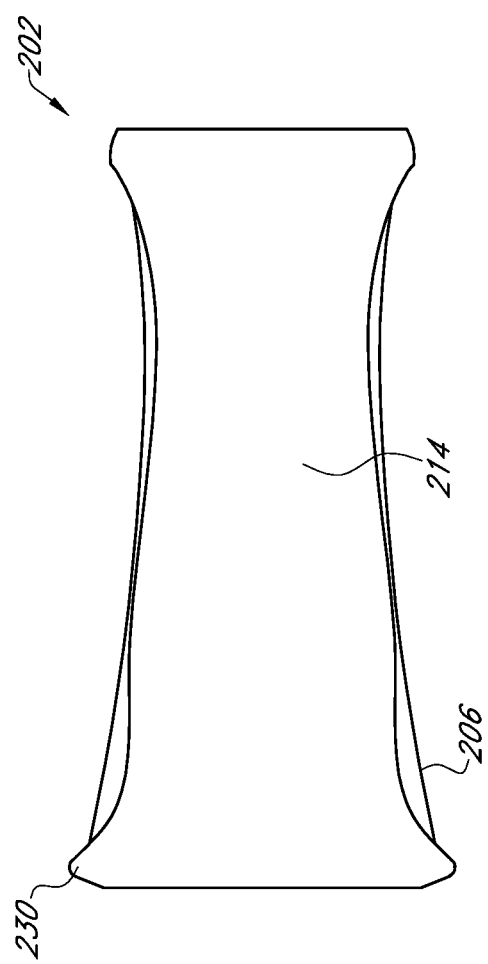
FIG. 11C is a side view of the base of FIG. 11B.
Figure 11D:
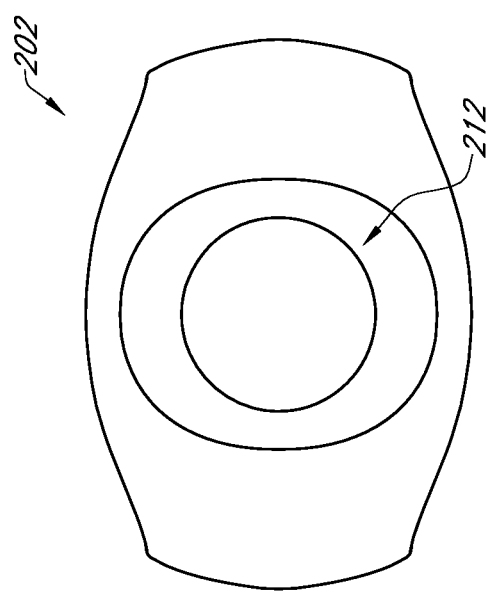
FIG. 11D is a top view of the base of FIG. 11B.

As shown in at least FIG. 11C, the upper end 294 of the base 202 can have a depth that is larger than a depth of the lower end 296 of the base 202. Such configurations can allow the angler to more easily grip the reel knob when assembled.

In some embodiments, the \ surface of the side wall 214 of the base 202 positioned between the first and second recessed areas 206A, 206B is contoured to enhance usability and comfort. For example, the base 202 can include a lower region 298 and an upper region 297. The lower region 298 and/or the upper region 297 can be curved along a length of the lower and upper regions 298, 297. For example, the upper region 297 and/or the lower region 298 can have a concave portion. As shown, the upper region 297 and/or the lower region 298 can extend outwardly from the longitudinal axis of the base 202. In some embodiments, the surface of the side wall 214 transitions smoothly between the upper region 297 and the lower region 298. For example, the lower region 298 and the upper region 297 can form a convex portion that faces away from the longitudinal axis of the reel knob 200. In some embodiments, the lower region 298 transitions to the upper region 297 at an inflection point 299.

As shown in the illustrated embodiment, the lower region 298 can have a maximum width and the upper region 297 can have a maximum width. In some embodiments, the maximum width of the lower region 298 is less than the maximum width of the upper region 297. Such configurations can enhance the angler's ability to grip and/or control the reel knob when assembled. In some embodiments, a width of the base 202 at the inflection point 299 is greater than the maximum width of the lower region 298. In some embodiments, the width of the base 202 at the inflection point 299 is less than the maximum width of the upper region 297.

In some embodiments, the recessed area 206 can include a lip 230. The lip 230 can surround a perimeter of the first and/or second recessed area 206A, 206B of the base 202.

FIG. 12 illustrates an embodiment of the gripping member 204. The gripping member 204 can be shaped and/or sized to correspond to the first and second recessed areas 206A, 206B when applied thereto. The gripping member 204 may be folded and/or wrapped around the first and second recessed areas 206A, 206B. The gripping member 204 can be bonded, adhered, or otherwise attached to at least a portion of the base 202, such as the recessed areas 206A, 206B. The size and shape of the gripping member 204 can be the same and/or similar to the size and shape of the first and second recessed areas 206A, 206B.

Terminology

The various features and processes described above may be used independently of one another, or may be combined in various ways. All possible combinations and sub-combinations are intended to fall within the scope of this disclosure. In addition, certain methods or processes may be omitted in some implementations. The methods and processes described herein are also not limited to any particular sequence. For example, described the methods may be performed in an order other than that specifically disclosed, or multiple steps may be combined in a single step or may be performed in parallel with some other steps. The example systems and components described herein may be configured differently than described. For example, elements may be added to, removed from, or rearranged compared to the disclosed example embodiments.

Certain terminology may be used in the description for the purpose of reference only, and thus is not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language, for example, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text or in the figures, the systems and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the systems and methods with which that terminology is associated.

While the invention has been discussed in the context of certain embodiments and examples, it should be appreciated that the present invention extends beyond the specifically disclosed embodiments to other alternative embodiments and/or uses of the inventions and obvious modifications and equivalents thereof. Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Additionally, the skilled artisan will recognize that any of the above-described methods can be carried out using any appropriate apparatus. Further, the disclosure herein of any particular feature, aspect, method, property, characteristic, quality, attribute, element, or the like in connection with various embodiments can be used in all other embodiments set forth herein. Additionally, processing steps may be added, removed, or reordered. A wide variety of designs and approaches are possible.

For purposes of this disclosure, certain aspects, advantages, and novel features of the embodiments are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

What is claimed is:

1. A reel knob of a fishing reel comprising:
   a base defining an underlisting, the base comprising:
      a side wall;
      a top wall forming an exposed end;
      a fastener hole defining an opening in the top wall; and
      a recessed area including:
         a lip that surrounds at least a portion of the recessed area and is configured to protect the exposed end,
         wherein the recessed area extends along at least a portion of the side wall and the top wall, and
         wherein the recessed area surrounds the fastener hole along the top wall; and
   a gripping member comprising a resilient material,
      wherein the gripping member is shaped to correspond to the recessed area of the base, and
      wherein the gripping member is adhered to the recessed area of the base such that the gripping member fills at least a portion of the recessed area.

2. The reel knob of claim 1, wherein the recessed area extends along a first side and a second side of the side wall.

3. The reel knob of claim 1, wherein a surface of the gripping member is approximately aligned with a surface of the base to create a smooth transition from the surface of the gripping member to the surface of the base.

4. The reel knob of claim 1, wherein a surface of the gripping member is positioned inwardly from a surface of the base.

5. The reel knob of claim 1, wherein the base further comprises a bottom wall, wherein the recessed area does not extend along the bottom wall.

6. The reel knob of claim 1, wherein the base further comprises a bottom wall configured to be positioned adjacent a reel handle.

7. The reel knob of claim 1, wherein the side wall has a maximum width at a first region, wherein a distance between the first region and the bottom wall of the base is greater than a distance between the first region and the top wall of the base.

8. The reel knob of claim 7, wherein the distance between the first region and the bottom wall of the base is approximately twice the distance between the first region and the top wall of the base.

9. The reel knob of claim 1, wherein the side wall has a maximum width at a first region, and wherein the maximum width at the first region is greater than a maximum width of the top wall.

10. The reel knob of claim 1, the recessed area further including a side recessed portion extending along a portion of the side wall, an intermediate recessed portion extending along a portion of the side wall, and a central recessed portion extending along the top wall, wherein the intermediate recessed portion transitions between the side recessed portion and the central recessed portion.

11. The reel knob of claim 10, wherein the intermediate recessed portion is tapered from the side recessed portion towards the central recessed portion.

12. The reel knob of claim 1, wherein the recessed area is spaced away from a lower edge of the side wall, wherein the lower edge is positioned opposite an upper edge formed between the top wall and the side wall.

13. The reel knob of claim 1, wherein the gripping member further comprises a first portion, a central portion, and a second portion, wherein the first portion is connected to the central portion by a first connecting portion and the second portion is connected to the central portion by a second connecting portion.

14. The reel knob of claim 13, wherein the first connecting portion has a width that is narrower than a maximum width of the first portion.

15. The reel knob of claim 13, wherein the central portion includes an aperture configured to surround the fastener hole.

16. The reel knob of claim 1, wherein the resilient material further comprises a polyurethane coating.

17. The reel knob of claim 1, wherein a surface of the recessed area extending along the side wall forms a concave surface.

18. The reel knob of claim 1, wherein the gripping member includes a pattern configured to increase friction properties of the gripping member.

19. A fishing pole comprising:
a fishing reel including the reel knob of claim 1.

* * * * *